(12) United States Patent
Volos et al.

(10) Patent No.: US 10,768,004 B2
(45) Date of Patent: Sep. 8, 2020

(54) TRAVEL ROUTING SELECTION SYSTEM AND METHODS IMPLEMENTED BASED ON CHARACTERIZATION OF HISTORICAL LATENCY DATA

(71) Applicants: DENSO International America, Inc., Southfield, MI (US); DENSO CORPORATION, Kariya, Aichi-pref. (JP)

(72) Inventors: Haris Volos, Sunnyvale, CA (US); Kenji Konishi, San Jose, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 200 days.

(21) Appl. No.: 15/882,489

(22) Filed: Jan. 29, 2018

(65) Prior Publication Data
US 2019/0234752 A1    Aug. 1, 2019

(51) Int. Cl.
*G01C 21/34* (2006.01)
*H04L 29/08* (2006.01)
(Continued)

(52) U.S. Cl.
CPC ..... *G01C 21/3492* (2013.01); *G01C 21/3453* (2013.01); *G05D 1/0285* (2013.01);
(Continued)

(58) Field of Classification Search
None
See application file for complete search history.

(56) References Cited

U.S. PATENT DOCUMENTS 8,612,599 B2    12/2013  Tung et al.
8,849,494 B1 *   9/2014  Herbach ............... B60W 30/00
                                                            701/24
(Continued)

OTHER PUBLICATIONS

"Amazon CloudWatch—User Guide", Nov. 2, 2016, retrieved from: https://docs.aws.amazon.com/AmazonCloudWatch/latest/monitoring/cloudwatch_concepts.html#Statistic on Oct. 8, 2019 (Year: 2016).*
(Continued)

*Primary Examiner* — Christian Chace
*Assistant Examiner* — Amelia J. I. Vorce
(74) *Attorney, Agent, or Firm* — Harness, Dickey & Pierce, P.L.C.

(57) ABSTRACT

A travel route selection system is provided and includes historical latency data and travel route modules. The historical latency data module includes data and characterization modules. The data module collects historical latency data. The historical latency data are associated with transmission of signals in a network for one or more vehicle applications of a vehicle. The characterization module: obtains characteristic distributions of the historical latency data at selected locations along travel routes; based on the characteristic distributions, (i) calculates metrics along the travel routes for the vehicle, or (ii) combines the characteristic distributions to obtain an overall distribution for each of the travel routes; and based on the metrics or the overall distribution, performs a statistical process to predict latencies of the signals along each of the travel routes. The travel route module selects one of the travel routes based on the predicted latencies of the signals.

23 Claims, 27 Drawing Sheets

(51) Int. Cl.
*G08G 1/00* (2006.01)
*G05D 1/02* (2020.01)
*H04L 12/26* (2006.01)
*H04L 12/24* (2006.01)
*G08G 1/09* (2006.01)
*G08G 1/16* (2006.01)
*G08G 1/01* (2006.01)

(52) U.S. Cl.
CPC .......... *H04L 41/5009* (2013.01); *H04L 43/08* (2013.01); *G05D 1/0217* (2013.01); *G05D 2201/0213* (2013.01); *G08G 1/0129* (2013.01); *G08G 1/22* (2013.01); *H04L 67/12* (2013.01)

(56) References Cited

U.S. PATENT DOCUMENTS

| | | | |
|---|---|---|---|
| 8,930,979 B2 | 1/2015 | Tidwell et al. | |
| 9,476,715 B2* | 10/2016 | Wharton | G01C 21/3461 |
| 9,974,044 B2* | 5/2018 | Rao | H04W 4/029 |
| 2007/0129880 A1 | 6/2007 | Thacher | |
| 2014/0257695 A1* | 9/2014 | Annapureddy | G01C 21/00 |
| | | | 701/537 |
| 2015/0142301 A1* | 5/2015 | Dave | G01C 21/3461 |
| | | | 701/423 |
| 2015/0215738 A1* | 7/2015 | Frusina | H04W 4/023 |
| | | | 455/426.1 |
| 2015/0254986 A1* | 9/2015 | Fairfield | G08G 1/22 |
| | | | 707/687 |
| 2016/0223355 A1* | 8/2016 | Habib | G01C 21/3492 |
| 2017/0160742 A1* | 6/2017 | Ross | H04W 4/027 |
| 2017/0272972 A1* | 9/2017 | Egner | H04W 28/0268 |
| 2018/0367613 A1* | 12/2018 | Regmi | H04W 4/44 |

OTHER PUBLICATIONS

Information Technology Laboratory: "1.3.5.2. Confidence Limits for the Mean", Jul. 27, 2012, retrieved from: https://www.itl.nist.gov/div898/handbook/eda/section3/eda352.htm on Oct. 8, 2019 (Year: 2012).*

Penn State: "Probability Density Functions", Nov. 1, 2010 retrieved from: https://onlinecourses.science.psu.edu/stat414/node/97 on Oct. 8, 2019 (Year: 2010).*

* cited by examiner

| Route | Min. Latency (ms) | Max. Latency (ms) | Distance (m) | Sum of Min. Latencies (ms) | Sum of 50% Latencies (ms) | Sum of 95% Latencies (ms) |
|---|---|---|---|---|---|---|
| A | 50 | 720 | 8628 | 3069 | 6819 | 19269 |
| B | 50 | 665 | 9472 | 3018 | 6724 | 19029 |
| C | 50.1 | 639 | 8315 | 2957 | 6347 | 17600 |

Table 1: Possible Metrics for Each Route

FIG. 26

TRAVEL ROUTING SELECTION SYSTEM AND METHODS IMPLEMENTED BASED ON CHARACTERIZATION OF HISTORICAL LATENCY DATA

FIELD

The present disclosure relates to in-vehicle implemented applications and latency of corresponding signals.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modern vehicles implement various software applications (hereinafter referred to as "applications"). Some example applications are a lane change application, a collision avoidance application, a ramp routing application, and a platooning application. A lane change application may be executed to assist a driver of a vehicle and/or control vehicle operation during a lane change event, which includes moving a vehicle from a first lane of traffic to a second lane of traffic. A collision avoidance application may be executed to prevent a collision with a pedestrian, a vehicle and/or other object. A collision avoidance application may detect conditions of an environment and perform countermeasures to prevent a collision. This may include, for example, generating warning signals, assisting a driver of a vehicle in performing certain tasks (e.g., braking), and/or controlling operation of the vehicle.

A ramp routing application is similar to a lane change application and may be executed to assist a driver of a vehicle and/or control vehicle operation when moving a vehicle from a lane of traffic to an entrance ramp or an exit ramp. A platooning application may be executed to assist a driver of a vehicle during a platooning event. A platooning event refers to when one or more "follow" vehicles are controlled to closely follow one or more "lead" vehicles. A follow vehicle may also be a lead vehicle. Each follow vehicle may draft a lead vehicle. This is done to reduce drag on the follow vehicle for improved fuel efficiency and to reduce vehicle congestion within a given geographical area. Platooning that is implemented in a first geographical area can reduce congestion in other nearby geographical areas.

SUMMARY

A travel route selection system is provided and includes a historical latency data module and a travel route module. The historical latency data module includes a first data module and a characterization module. The first data module is configured to collect historical latency data. The historical latency data are associated with transmission of signals in a network for one or more vehicle applications of a vehicle. The characterization module is configured to: obtain characteristic distributions of the historical latency data at selected locations along travel routes; based on the characteristic distributions, at least one of (i) calculate metrics along the travel routes for the vehicle, or (ii) combine the characteristic distributions to obtain an overall distribution for each of the travel routes; and based on at least one of the metrics or the overall distribution, perform a statistical process to predict latencies of the signals along each of the plurality of travel routes. The travel route module is configured to select one of the travel routes based on the predicted latencies of the signals.

In other features, a method of operating a vehicle route selection system is provided. The method includes: collecting historical latency data associated with transmission of signals in a network for one or more vehicle applications of a vehicle; obtaining characteristic distributions of the historical latency data at selected locations along travel routes; based on the characteristic distributions, at least one of (i) calculating metrics along the travel routes for the vehicle, or (ii) combining the characteristic distributions to obtain an overall distribution for each of the travel routes; based on at least one of the metrics or the overall distribution, performing a statistical process to predict latencies of the signals along each of the travel routes; and selecting one of the travel routes based on the predicted latencies of the signals.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 26 is an example table of metrics for each of the travel routes A-C of FIGS. 23-25.

In the drawings, reference numbers may be reused to identify similar and/or identical elements.

DETAILED DESCRIPTION

The various applications implemented in vehicles often include the reception and/or transmission of signals, for example, between vehicles, between vehicles and road side devices (or road side units), between road side devices, between vehicles and devices in a cloud-based network, and/or between other network devices. There are latencies associated with propagation of the signals and processing and queueing of data associated with the signals. Depending on the durations of these latencies, some of the data transferred may be outdated and as a result unusable. This can limit and/or prevent use of an application.

Examples set forth herein include characterizing and projecting latencies and enabling vehicle applications and/or characterizing and valuing data from vehicle applications based on the latency characterizations and projections. Vehicle applications that have corresponding latencies, which satisfy latency requirements, are enabled. The examples also include network routing of signals based on the latency characterizations and projections. The examples disclosed herein are applicable to lane change applications, collision avoidance applications, ramp routing applications, platooning applications and/or other in-vehicle implemented applications. The examples further include selecting travel routes of vehicles based on characterization of historical latency data.

Figure 1:
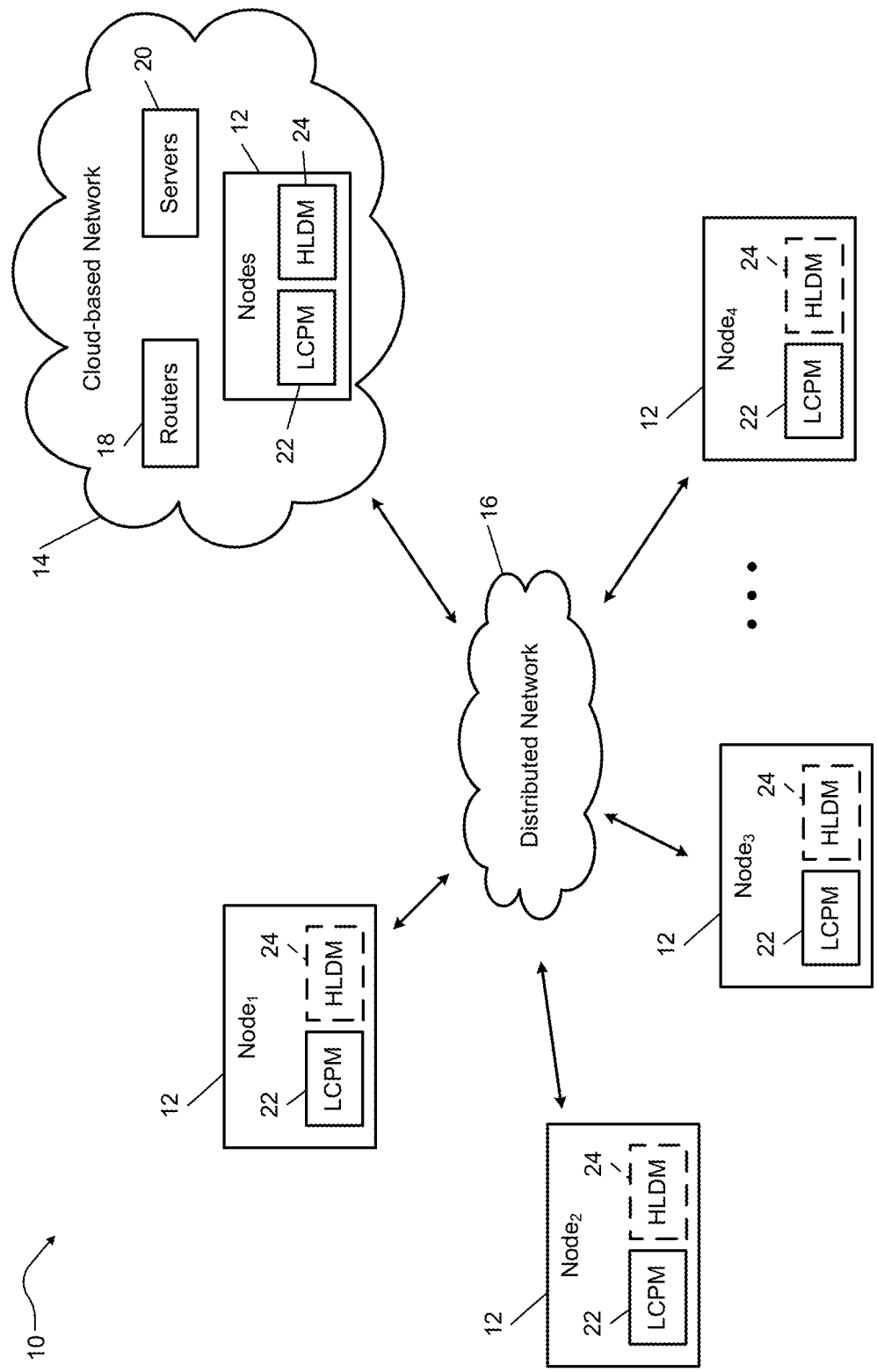
FIG. 1 is a functional block diagram of an example of a latency based vehicle operating system including nodes each having a latency characterization and prediction module (LCPM) and/or a historical latency data module (HLDM) in accordance with an embodiment of the present disclosure.

FIG. 1 shows an example of a latency based vehicle operating system 10 that operates as a distributed edge computing system, which may span a geographical area (e.g., an office, a building, a neighborhood city, multiple cities, one or more states, and/or one or more countries). The latency based vehicle operating system 10 provides a distributed architecture, which may be implemented in a distributed environment similar to that shown in FIG. 2. The latency based vehicle operating system 10 includes nodes 12 and a cloud-based network (or "the cloud") 14. One or more of the nodes may be located in the cloud-based network. As an example, the nodes 12 may communicate with each other directly or via a distributed network 16. The distributed network may include the Internet, switches, routers, base stations, gateways, satellites, intermediary communication devices. The cloud-based network 14 may include some of the nodes 12, routers, 18, servers 20 and/or other network devices. Although shown separately, the nodes 12 of the cloud-based network 14 may be implemented as or in one or more of the servers 20. Each of the nodes 12 may include a LCPM 22 and/or a HLDM 24. The LCPMs 22 perform latency characterization and provide latency models and projections for signals transmitted between the nodes. The one or more HLDMs 24 characterize historical latency data and provide latency models and projections including distance based latency estimates.

In one embodiment, one of the nodes includes a HLDM and the other nodes do not include an HLDM. In another embodiment, one of the servers 20 and/or nodes 12 of the cloud-based network 14 includes a full-scale version of a HLDM and the other nodes include a partial-scale version of a HLDM. For example, a full-scale version of a HLDM may store all historical latency data for the latency based vehicle operating system 10 and process the historical latency data to provide latency distributions and projections based on the historical latency data stored in the cloud-based network. The partial-scale versions of a HLDM of the other nodes may store a portion of the historical latency data and/or perform a limited amount of calculations and/or a limited amount of processing of the corresponding portions of the historical latency data.

Each of the nodes outside of the cloud-based network 14 may be a vehicle, a road side device (RSD), or other network device. A RSD may be located at a signal light, on a building, on a pole near a road, or on some other structure. A RSD may monitor an environment in a local area of the RSD, monitor latencies of signals transmitted to and/or from the RSD, and/or share to other nodes information indicative of a state of the environment, the latencies, and/or other related information, as further described below.

By having a LCPM at each of the nodes, a network of LCPMs is provided that is able to share latency information. The latency information may be used to (i) determine whether to enable and/or execute in-vehicle applications (referred to as "applications"), (ii) best network routes for signal transmission, and/or (iii) best vehicle routes for vehicles to follow. The latency characterization and prediction includes determining a current latency status, determining latency trends, and predicting latency characteristics. The latency characterization is based on probabilistic modeling that allows for calculating confidence intervals for expected latencies. This information is provided based on contextual parameters and information, if the contextual parameters and information are available. Some examples of contextual parameters and information are: a number of vehicles connected to and utilizing network services within a given geographical area; an identification of the geographical area; a date; a day of the week; a time of day; whether it is a holiday; current weather conditions; whether a major event is occurring; vehicle traffic data; etc.

Figure 2:
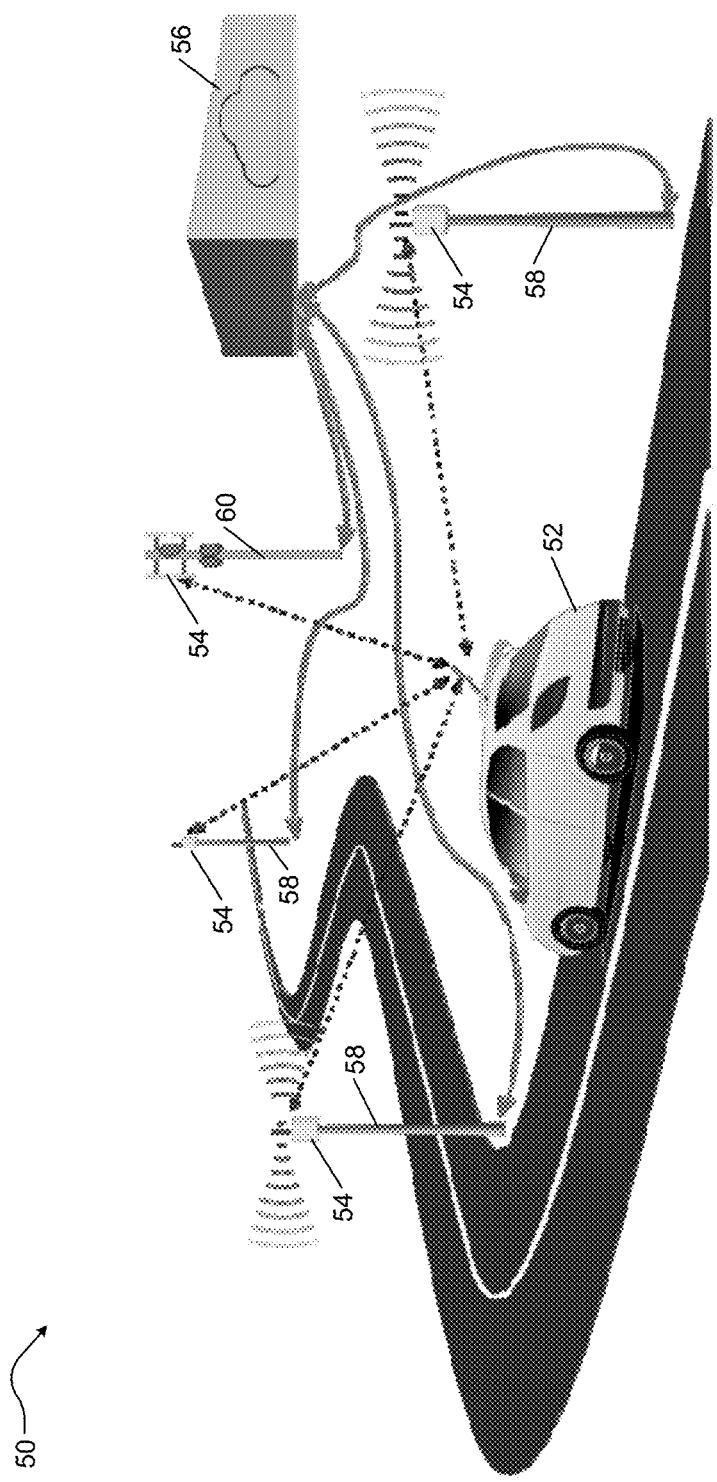
FIG. 2 is a perspective view of an example of a vehicle application enabling and network routing system in accordance with an embodiment of the present disclosure.
Figure 6:
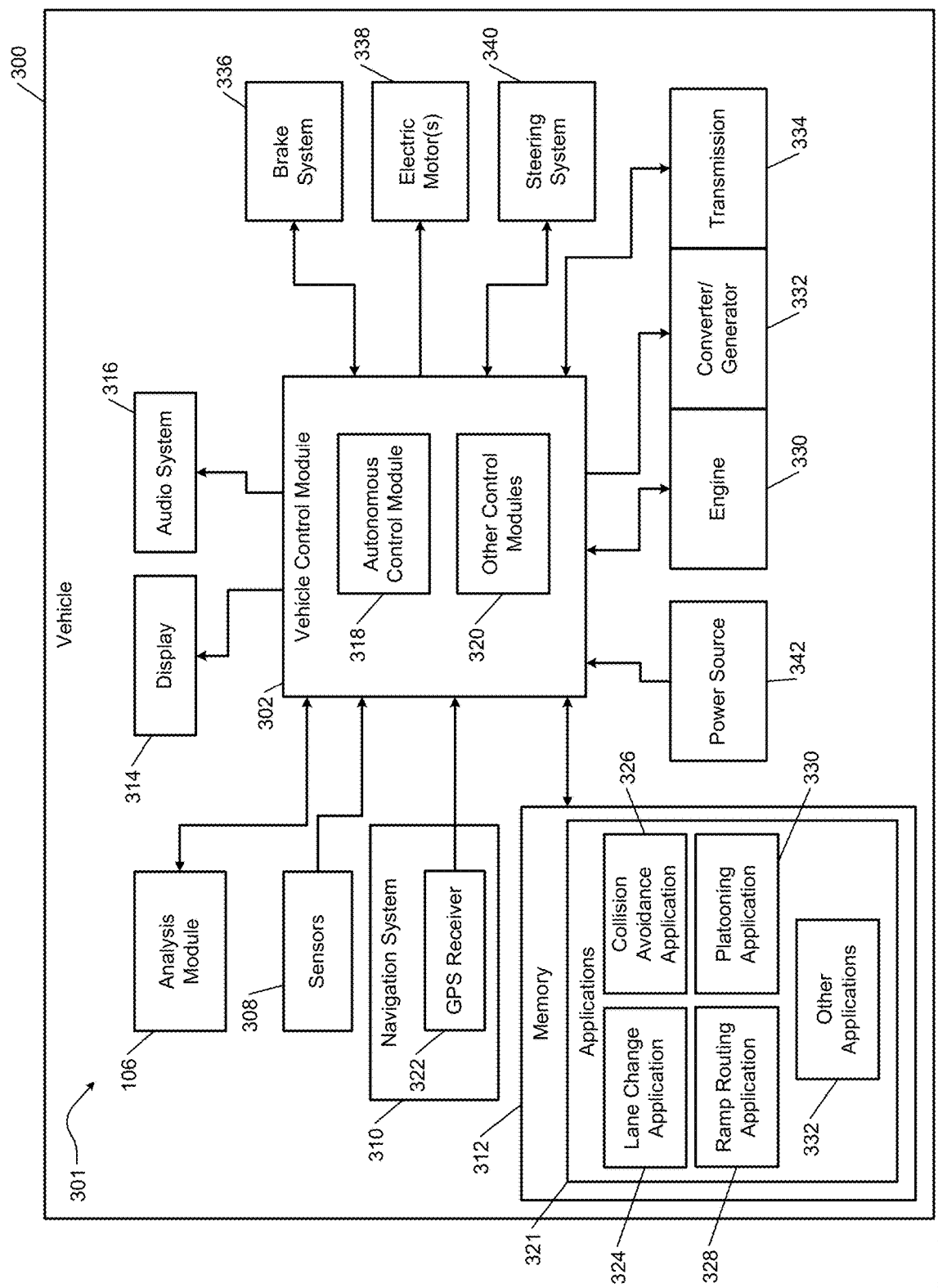
FIG. 6 is a functional block diagram of an example of a vehicle in accordance with an embodiment of the present disclosure.

FIG. 2 shows a vehicle application enabling and network routing system 50 that includes a vehicle 52, RSDs 54, and a cloud-based datacenter 56. The vehicle 52, the RSDs 54, and the cloud-based datacenter 56 may be implemented as nodes 12 of FIG. 1 and/or as other nodes described herein. The RSDs 54 provide location specific information to the vehicle 52, whereas the cloud-based datacenter 56 may provide local and/or non-local information to the vehicle 52. For example, one of the RSDs 54 may indicate to the vehicle environmental information in a local area of the RSD, such as indicate existence of pedestrians and/or other vehicles, provide signal light status updates, provide road conditions, etc. The cloud-based datacenter 56 may provide environmental information associated with each geographical area of the RSDs 54 and/or the cloud-based datacenter 56. A vehicle control module (an example vehicle control module is shown in FIG. 6) of the vehicle 52 may enable one or more applications based on the information received from the RSDs 54 and/or the cloud-based datacenter 56.

The cloud-based datacenter 56 may be implemented in the cloud-based network 14 of FIG. 1. The RSDs 54 may be implemented on poles 58 along a road, at a cell tower 60, or on some other structure. Each of the RSDs 54 may communicate and share information with any number of vehicles. The shared information may include data collected from one or more cameras and/or other sensors. The cameras and/or sensors may be located at the RSDs 54. Each RSD 54 may share information received from other RSDs, nodes and/or network devices. The cell tower 60 may provide network connectivity for the nodes and/or the cloud-based datacenter 56. In one embodiment, the cell tower 60 is not implemented as a node in the vehicle application enabling and network routing system 50, but rather simply provides connectivity services.

In one embodiment, each LCPM of the nodes of FIGS. 1 and 2 collects (i) latency data associated with a corresponding node of that LCPM (or first LCPM), and/or (ii) latency data of other nodes having LCPMs directly connected to the first LCPM. In another embodiment, a first LCPM of a node of FIGS. 1 and 2 collects latency data from other LCPMs along a selected route and/or along possible routes of a corresponding vehicle of the first LCPM. Each of the LCPMs of vehicles may perform in this manner. Each of the LCPMs of vehicles may collect latency data associated with typical routes of the vehicles for frequent destinations. In another embodiment, the LCPMs may share latency information, such that when a first node is not connected to a second node, a LCPM of the first node can estimate latency for communicating with the second node by receiving latency information associated with the second node from LCPMs of one or more other nodes. The stated latency information may be stored in memories of the nodes and/or in cache of the LCPMs.

The cloud-based datacenter 56 and/or the servers 20 of the cloud-based network 14 of FIG. 1 may have more processing power and a larger storage for processing and storing latency and contextual information than nodes implemented as vehicles and/or RSDs. For this reason, in another embodiment, the cloud-based datacenter 56 (or cloud-based node) includes a full-scale HLDM. The HLDM collects latency data measured by the LCPMs of FIGS. 1-2 and characterizes the latency data. The latency data and the results of the characterization may be stored along with corresponding contextual information in memory of the cloud-based datacenter 56. The HLDM may alternatively be located at some other regional or centrally located node. A HLDM may be located at any of the nodes. In an embodiment, each of the nodes includes at least a partial-scale HLDM.

In an embodiment, the HLDM implemented in the cloud-based network 14 characterizes the latency data and contextual information and provides tables, equations, models, distributions, metrics, etc. to one or more of the other nodes. This simplifies processing and storage at the other nodes and may increase speed at the other nodes in (i) determining expected latencies, and (ii) deciding whether to enable or execute applications.

Figure 3:
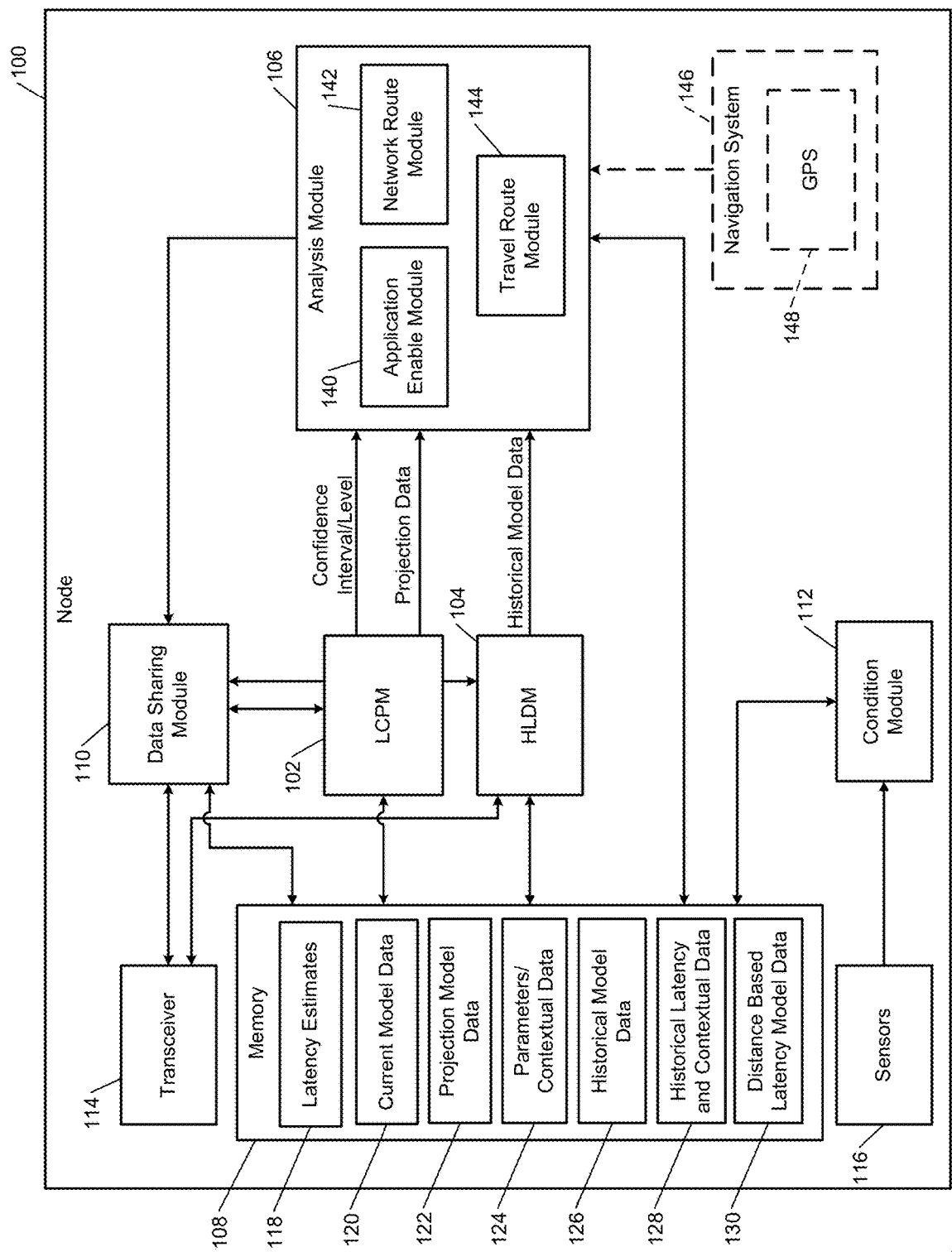
FIG. 3 a functional block diagram of an example of a node in accordance with an embodiment of the present disclosure.

FIG. 3 shows a node 100. The nodes of FIGS. 1-2 may be structured as the node 100. The node 100 may include a LCPM 102, a HLDM 104, an analysis module 106, a memory 108, a data sharing module 110, a condition module 112, a transceiver 114 and sensors 116. The sensors 116 may include cameras, objection detection sensors, temperature sensors, and/or other sensors that provide parameters and/or data associated with the state of the node 100 and/or an environment in which the node 100 is located. The parameters and data may include context data. The LCPM 102 and/or the data sharing module 110 may receive and/or calculate latency estimates 118 and store the latency estimates 118 in the memory 108. The LCPM 102 determines a confidence level and projection data based on the latency estimates 118, which is described below with respect to the methods of FIGS. 7 and 15. As described below, this may include generating current model data 120 and projection model data 122. The current model data 120 and the projection model data 122 may be generated based on various parameters and contextual data 124. The LCPM 102 may store the data 120, 122, 124 in the memory 108. The confidence level and the projection data are provided to the analysis module 106.

The HLDM 104 generates historical model data 126 based on historical latency and contextual data 128. This may include generating distance based latency model data 130. The HLDM 104 may store the data 126, 128, 130 in the memory 108.

The analysis module 106 may include an application enable module 140, a network route module 142, and a travel route module 144. The application enable module 140 enables (or permits) and/or initiates execution of applications implemented within a vehicle based on the confidence level, the projection data and/or other related information received from the LCPM 102. The network route module 142 selects a route for transmitting and receiving signals associated with an application based on the confidence level, projection data and/or other related information. The travel route module 144 selects a travel route of a vehicle based on the historical model data and/or other related information. Multiple possible travel routes may be determined by a navigation system 146, which may include a global positioning system (GPS) 148. The travel route module 144 may select one of the possible travel routes determined by the navigation system 146. This may be true, for example, if the node is a vehicle.

Figure 4:
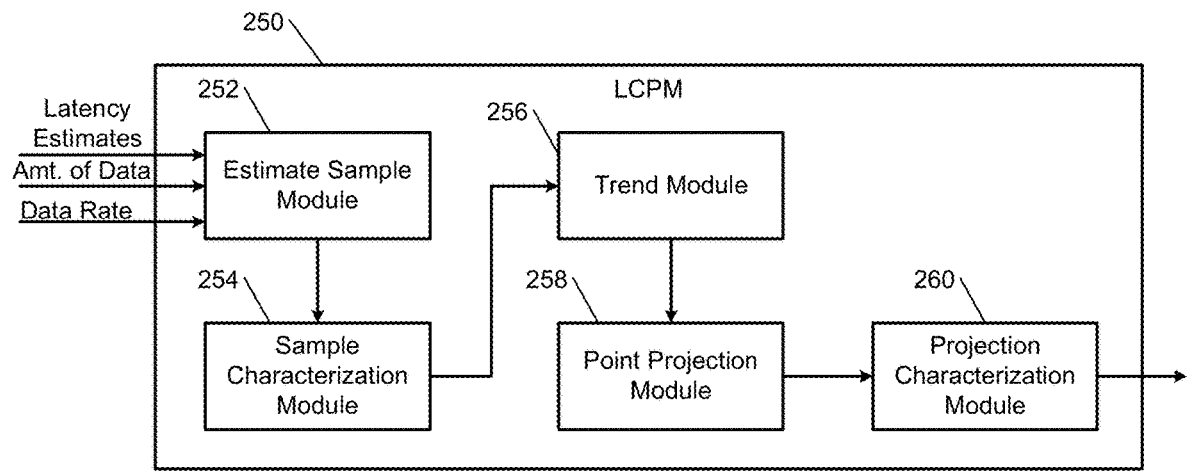
FIG. 4 is a functional block diagram of an example of a LCPM in accordance with an embodiment of the present disclosure.

FIG. 4 shows a LCPM 250. The LCPM 102 of FIG. 3 may be configured as the LCPM 250. In addition to determining confidence levels and projection data, the LCPM 250 may determine transmission delays associated with transmitting data between nodes, which is dependent on predetermined data transfer rates and the amounts of data being transferred. The LCPM 250 may include an estimate sample module 252, a sample characterization module 254, a trend module 256, a point projection module 258, and a projection characterization module 260. The estimate sample module 252 may receive latency estimates from other nodes, amounts of data to be transferred, and/or data rates associated with transferring the data. The latency estimates may be obtained using ping or timestamp based methods and/or via other methods. The estimate sample module 252 may calculate latencies (or time delays) based on the data rates of one or more links involved and the amounts of data being transferred on each link. The projection characterization module 260 may calculate latency confidence intervals and/or levels and latency projection data, which may include calculating transmission delays (time needed to transmit a predetermined amount of data). The transmission delays depend on the corresponding data transmission rates involved and the amounts of data being transferred. Operations of the modules 250, 252, 254, 256, 258 and 260 are further described below with respect to the methods of FIGS. 7 and 15.

Figure 5:
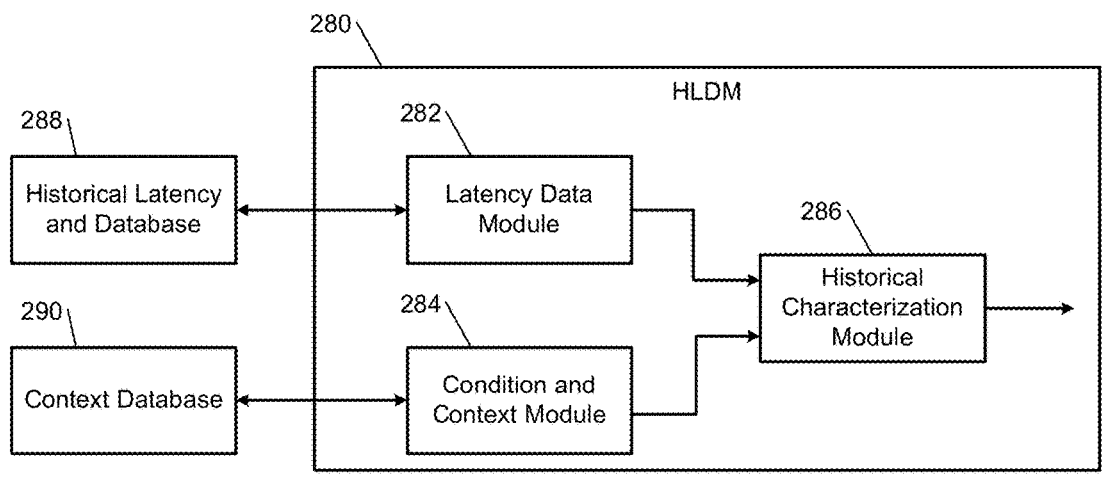
FIG. 5 is a functional block diagram of an example of a HLDM in accordance with an embodiment of the present disclosure.

FIG. 5 shows a HLDM 280. The HLDM 104 of FIG. 3 may be configured as the HLDM 280. The HLDM 280 may include a latency data module 282, a condition and context module 284, and a historical characterization module 286. The latency data module (or first data module) 282 may access a historical latency database 288. The condition and context module (or second data module) 284 may access a context database 290. The historical latency database 288 stores historical latency data for various nodes (e.g., nodes 12 of FIG. 1) and signals and data transferred between the nodes. The context database 290 stores historical context information associated with the historical latency data. Although shown as separate databases, the databases 288, 290 may be implemented as a single database, where the context data is stored with the corresponding historical latency data. Some or all of the historical latency data and the context data may be stored in the memory 108. Operations of the modules 280, 282, 284, 286 are further described below with respect to the methods of FIGS. 22 and 23.

The latency data referred to herein may include, for example, propagation latencies of signals, processing latencies of signals and data, and queueing of data latencies associated with the signals. The context data referred to herein may include, for example, vehicle identifiers (IDs), vehicle location information (e.g., latitudes and longitudes), vehicle speeds, vehicle headings and/or bearings, vehicle types, number of vehicles in a geographical area or linked to a network, weather metrics/conditions, time of day, dates, information regarding local incidents, information regarding major events, whether it is a holiday, number of vehicles and/or network devices connected (or linked) to a node, number of vehicles and/or network devices connected to a RSD, amount of data being transferred during a certain period of time across one or more links, etc. The context data including the above-stated parameters and information are used to improve and characterize latency estimates and predictions, as further described below. The stated context data is related to network load and amount of resources being utilized, such as the available wireless bandwidth, the amount of signal interference, the amount of available backhaul, etc. The stated context data may be used to capture network usage trends for the determined conditions. For example, a bad weather event may cause a vehicle traffic jam, which may also cause additional loads in a local network, which can negatively affect performance and increase latencies.

In one embodiment, the characterization modules 254, 260, 286 of FIGS. 5-6 characterize latency estimates respectively for current data, future data, and historical data. The characterization module 254 characterizes latency estimates for current collected data, which is used to estimate a current state of a network and the characterization module 260 identifies whether a latency trend is improving or not. The sample characterization module 254 may characterize latency estimates for a last short predetermined period of time, for example, a last predetermined number of minutes or hours. This is in contrast to the operation of the historical characterization module 286, which characterizes latency estimates for a last long predetermined period of time, for example, a last predetermined number of days, months or years. In an embodiment, the context data is then used to improve the characterization of the latency trend and latency predictions. This may include identifying whether the trend is improving or not.

FIG. 6 shows a vehicle 300 that may include a vehicle system 301, which may be implemented as a vehicle application enabling system, a network routing system, and/or a travel routing selection system. The vehicle system 301 may include the modules 102, 104, 106, 110 and 112 of FIG. 3. Of these modules the analysis module 106 is shown in FIG. 6. The vehicle 300 may further include vehicle control modules 306, sensors 308, a navigation system 310, a memory 312, a display 314 and an audio system 316. The vehicle control modules 302 may include an autonomous control module 318 and/or other control modules 320, such as an engine control module, a transmission control module, and a motor control module.

The sensors 308 may include cameras, objection detection sensors, temperature sensors, and/or other sensors that provide parameters and/or data associated with the state of the vehicle 300 and/or an environment in which the vehicle 300 is located. The parameters and data may include contextual data. The sensors 302 detect environmental conditions and status of vehicle devices. The navigation system 310 may include a GPS 322. The memory 312 may store the estimates and data stored by the memory 108 of FIG. 3 and applications 321. The applications 321 include a lane change application 324, a collision avoidance application 326, a ramp routing application 328, a platooning application 330, and/or other applications 332.

The vehicle control modules 302 may execute the applications 321 and may control operation of an engine 330, a converter/generator 332, a transmission 334, a brake system 336, electric motors 338 and/or a steering system 340 according to parameters, data, values, commands, etc. determined, calculated, estimated, predicted, and/or generated as a result of executing the applications 321. The vehicle control module 302 may receive power from a power source 342 which may be provided to the engine 330, the converter/generator 332, the transmission 334, the brake system 336, the electric motor(s) 338, the steering system 340, etc. The autonomous control module 318 may control operation of the engine 330, the converter/generator 332, the transmission 334, a brake system 336, one or more electric motor(s) 338, and steering system 340. The vehicle control modules 302 may generate output signals include warning, alert and/or status signals via the display 314, and/or the audio system 316. As an example, warning signals may be generated when objects are detected to avoid a collision.

The vehicle control modules 302 may be in communication with the analysis module 106 as shown and/or any of the modules 102, 104, 110, 112 of FIG. 3. The vehicle 300 may further include a transceiver, such as the transceiver 114 of FIG. 3. The vehicle control modules 302 may control operation of the engine 330, the converter/generator 332, the transmission 334, the brake system 336, the electric motors 338 and/or the steering system 340 based on outputs of the analysis module 106 and/or outputs from one or more of the modules 140, 142, 144.

The engine 330, the converter/generator 332, the transmission 334, the brake system 36 the electric motor(s) 338, and the steering system 340 may include actuators controlled by the vehicle control modules 302 to, for example, adjust fuel, spark, air flow, throttle position, pedal position, etc. This control may be based on the outputs of the sensors 308, the navigation system 310, and the GPS 322.

One of the other control modules 320 may perform countermeasures to avoid an accident by controlling at least some operations of the vehicle 300. This may include limiting speed of the vehicle, reducing speed of the vehicle, maintaining predetermined distances from objects, changing a lane, changing a direction of travel of the vehicle, generating alert/warning signals, etc.

Figure 7:
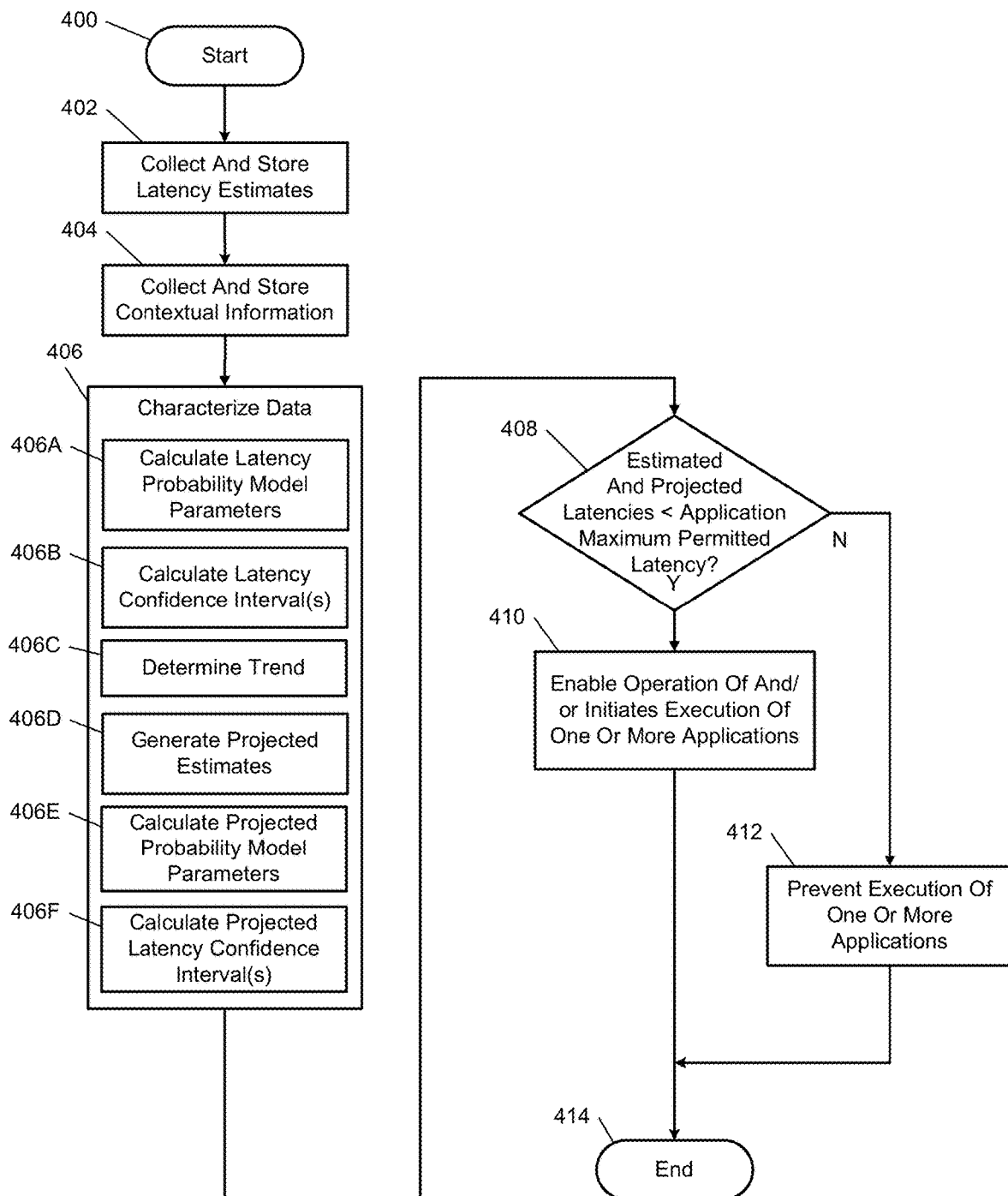
FIG. 7 illustrates an example application enabling method in accordance with an embodiment of the present disclosure.

The systems disclosed herein may be operated using numerous methods, example methods are illustrated in FIGS. 7, 15, 22 and 23. In FIG. 7, an example an example application enabling method is shown. Although the following operations of the following methods are primarily described with respect to the implementations of FIGS. 1-6, the operations may be easily modified to apply to other implementations of the present disclosure. The operations may be iteratively performed.

Figure 8:
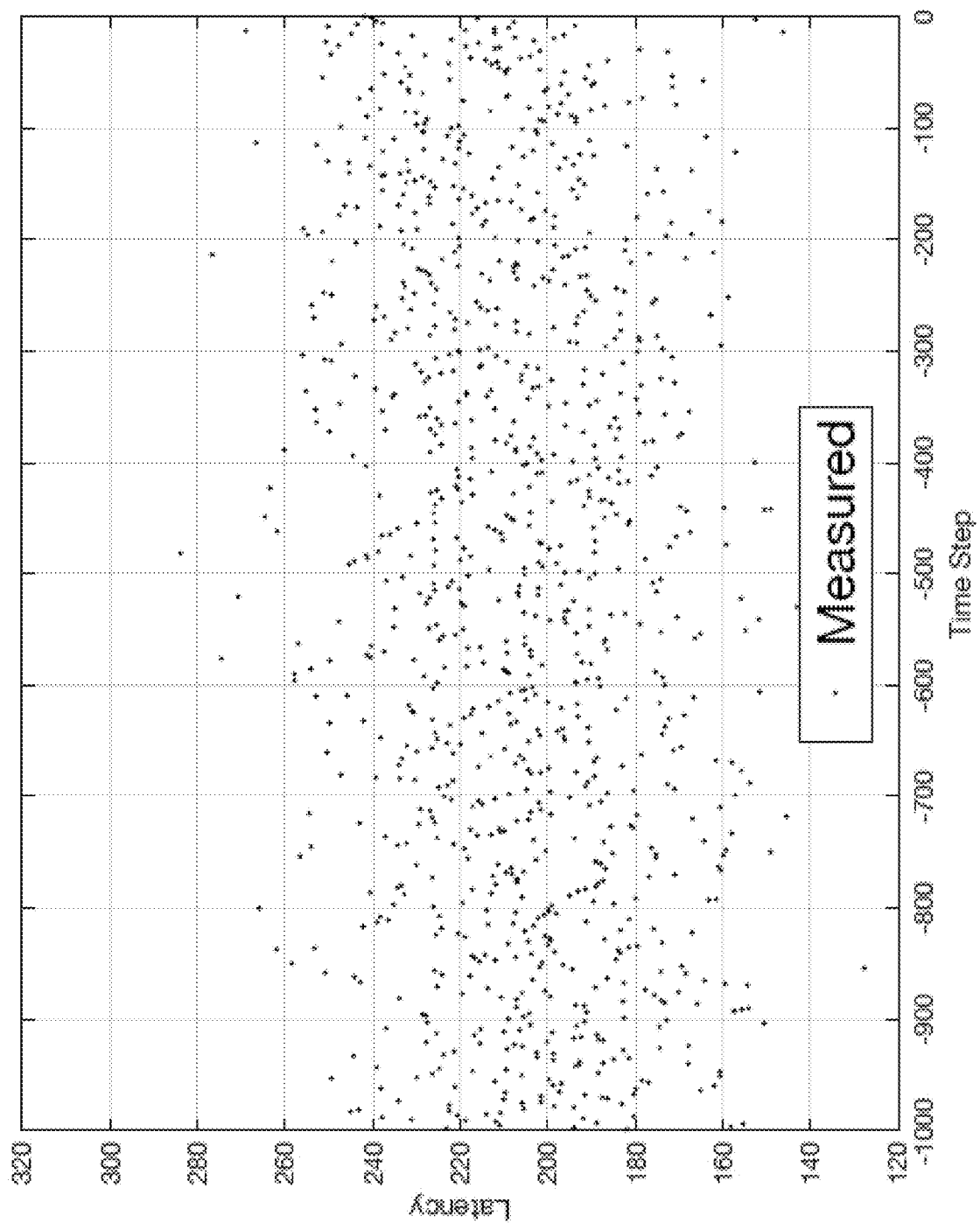
FIG. 8 is an example plot of latency samples.

The method may begin at 400. At 402, the estimate sample module 252 collects, calculates and/or stores latency estimates as described above. This may occur during a data collection mode of operation. The latency estimates may be determined based on data rates of links involved, amounts of data being transferred, and/or other associated information. FIG. 8 shows an example plot of latency samples. At 404, the estimate sample module 252 may also collect and store contextual (or context) information corresponding to the latency estimates.

Figure 9:
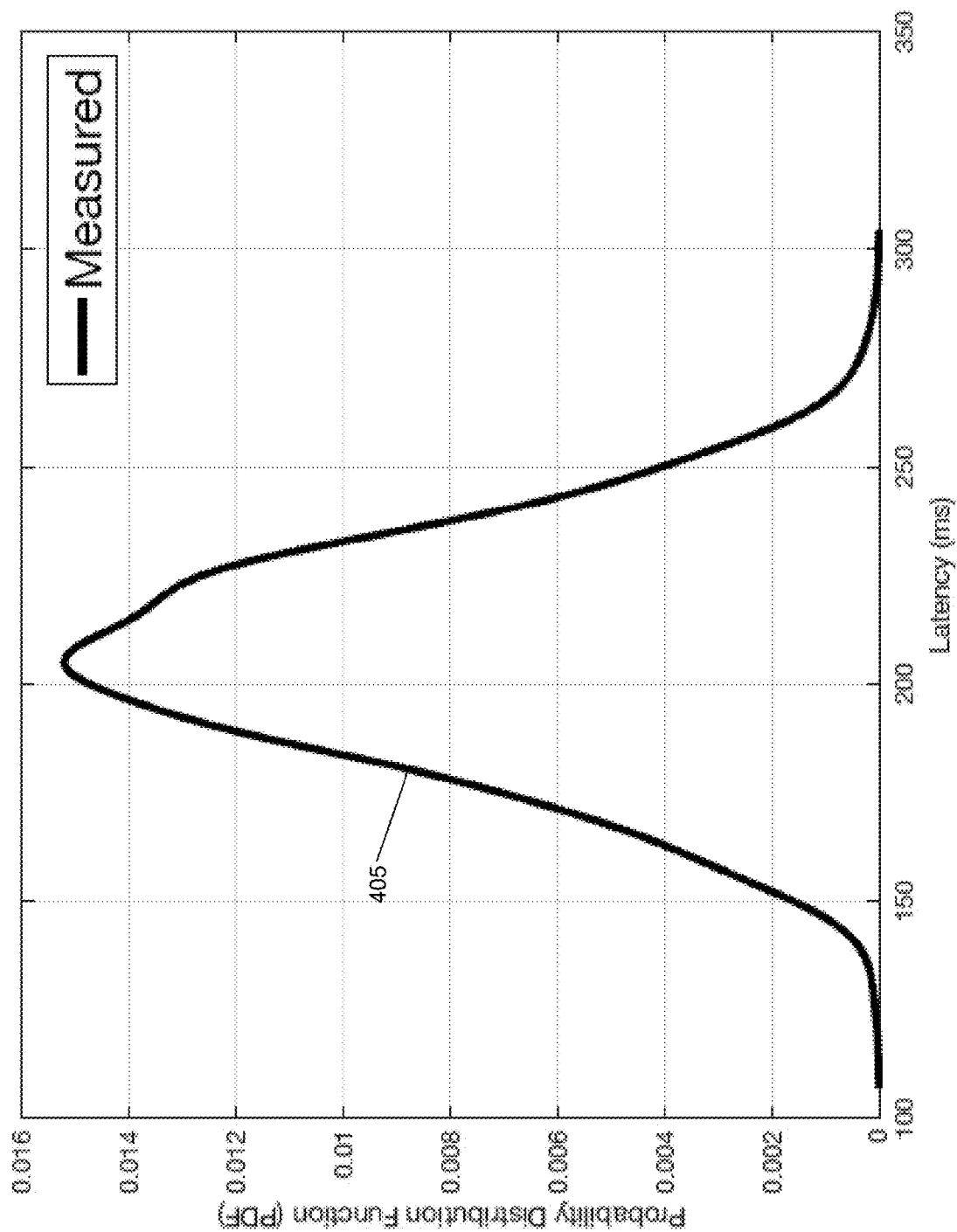
FIG. 9 is an example plot of a probability distribution function (PDF) curve that is based on the latency samples of FIG. 8.
Figure 10:
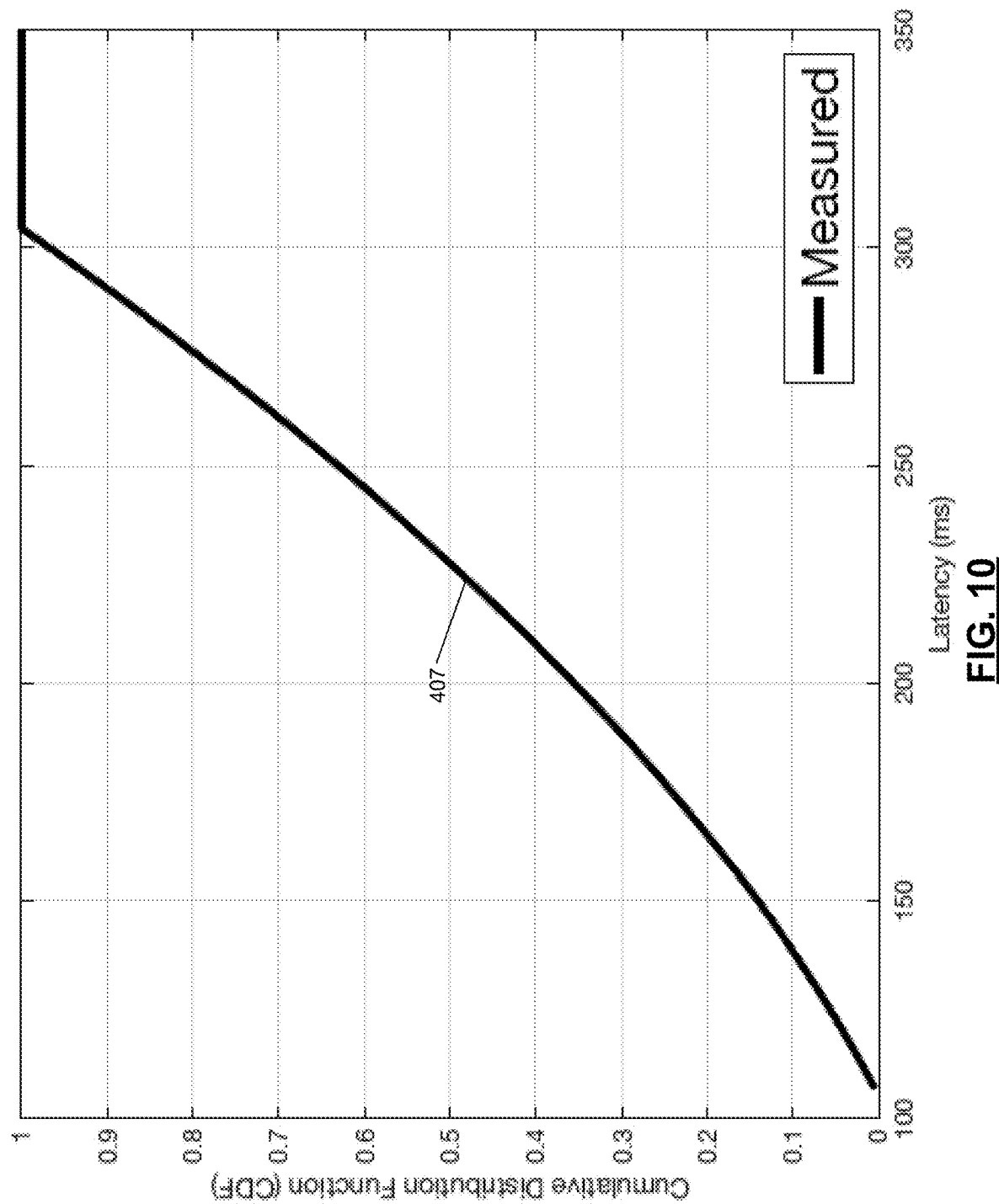
FIG. 10 is an example plot of a cumulative distribution function (CDF) curve that is based on the latency samples of FIG. 8 and/or the PDF of FIG. 9.

At 406, the sample characterization module 254 characterizes the latency estimates obtained during operation 402. In an embodiment, the last predetermined number N of latency estimates is characterized during a characterization mode. This includes probabilistic modeling, for example, estimating parameters of a normal distribution and/or creating one or more other characterization models. This may include calculating latency probability model parameters and calculating a latency confidence interval and/or level, as represented by operations 406A and 406B. In an embodiment, the latency estimates are characterized by generation of a model, which in one embodiment is in the form of a probability density (or distribution) function (PDF) curve. In FIG. 9, an example PDF curve 405 is shown for the latency estimates of FIG. 8. PDF estimation may be performed using, for example, empirical methods, such as histogram and kernel smoothing methods. Other model estimation methods may be performed including a Gaussian distribution method, a Half-normal distribution method, a method including a mixture of Gaussian functions, a Gamma distribution method, or other modeling method. A cumulative density (or distribution) function curve may be generated based on the PDF curve. In FIG. 10, an example CDF curve 407 is shown. The latency confidence interval and/or level may be determined based on the CDF curve.

Figure 11:
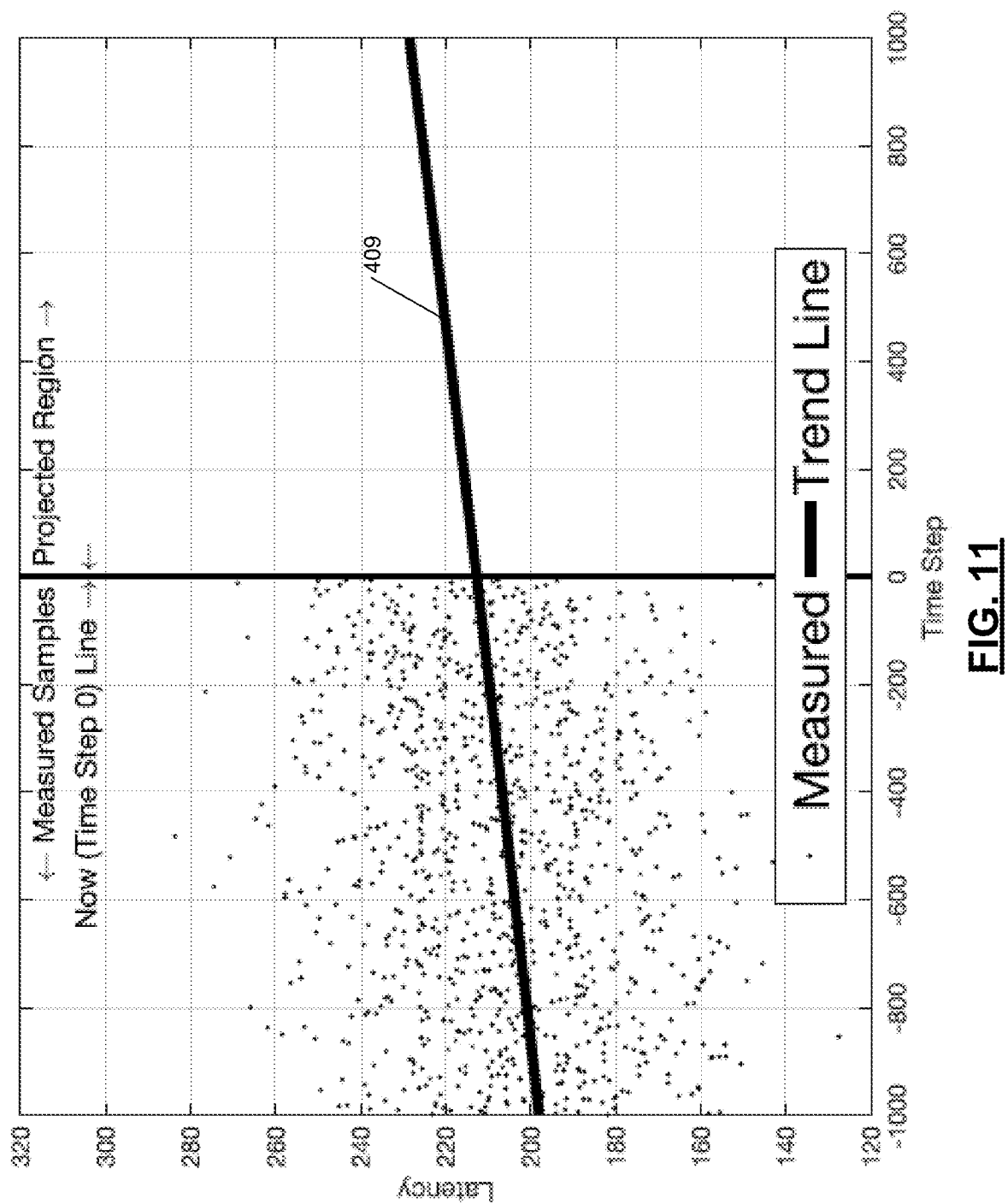
FIG. 11 is an example plot of the latency samples of FIG. 8 and a trend line in accordance with an embodiment of the present disclosure.

At 406C, the trend module 256 determines a trend based on the latency estimates. A last predetermined number M of latency estimates are used for trend analysis during an analysis mode. This may include using regression methods (linear and non-linear methods), auto-regression methods, auto-regressive-moving-average models, auto-regressive integrated moving average methods, Kalman filter prediction methods, trend following methods, neural networks, deep learning methods, and/or other trend analysis and/or machine learning techniques. This may include generating an estimated and projected trend line (or curve), such as the trend line 409 shown in FIG. 11. As an example, the trend line may be determined based on averages of the latency estimates for predetermined points in time or predetermined periods of time.

Figure 12:
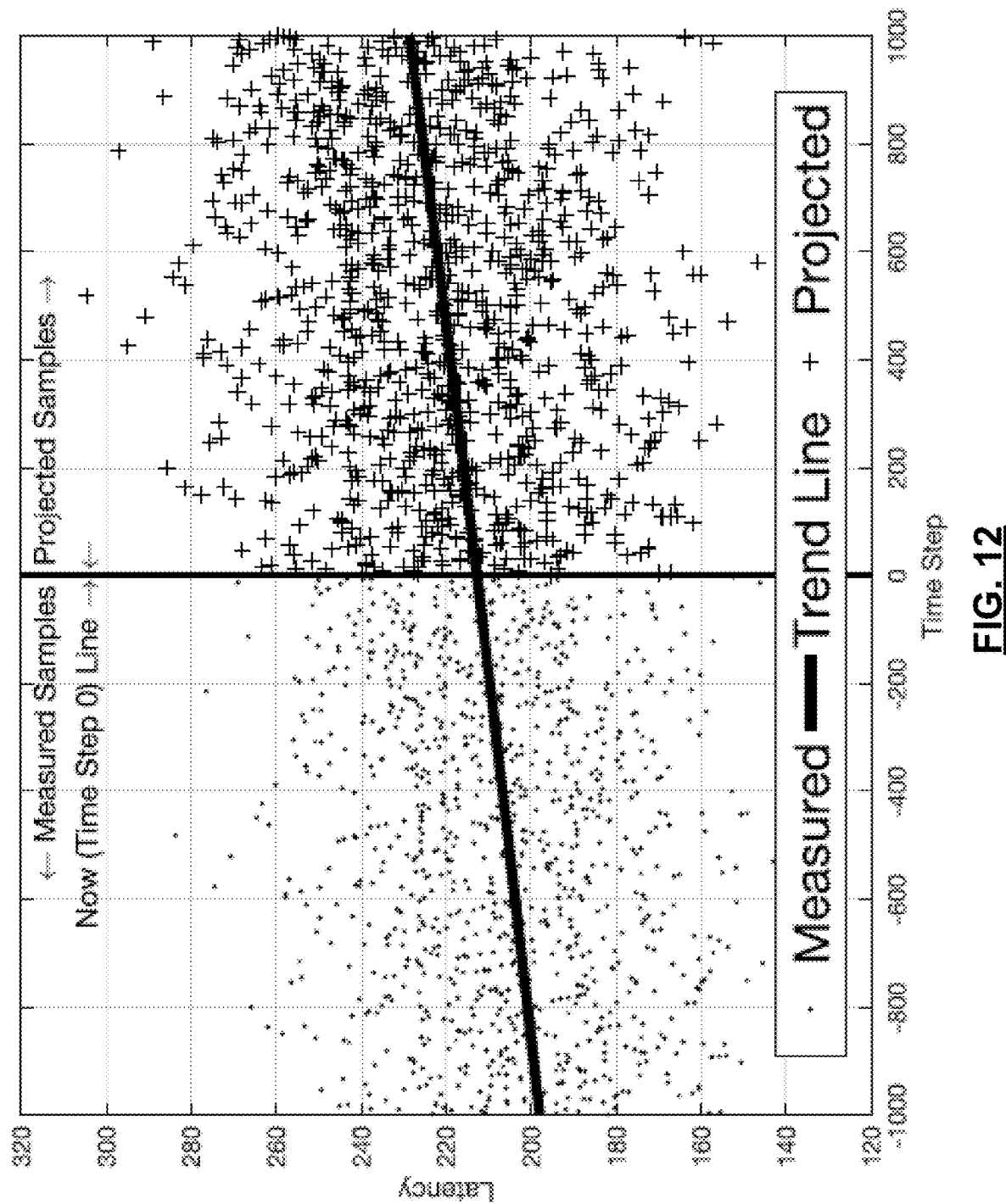
FIG. 12 is an example plot of the latency samples of FIG. 8, the trend line of FIG. 9, and projected latency samples in accordance with an embodiment of the present disclosure.

At 406D, the point projection module 258 generates projected latency estimates based on the trend line and/or the previously obtained latency estimates. FIG. 12 shows generated projected latency estimates.

Figure 13:
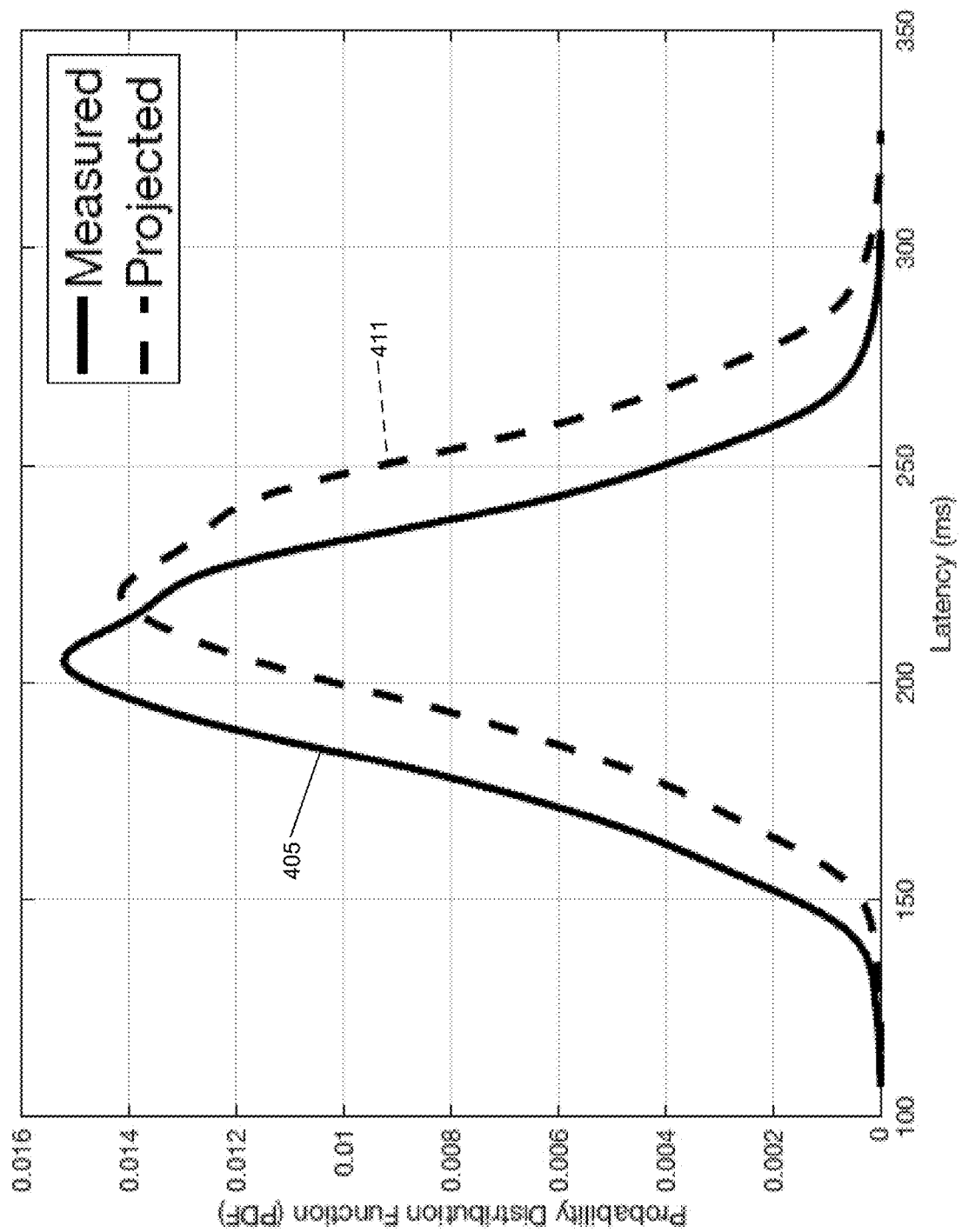
FIG. 13 is an example plot of the PDF curve of FIG. 9 and a projected PDF curve generated based on the projected latency samples of FIG. 12 in accordance with an embodiment of the present disclosure.
Figure 14:
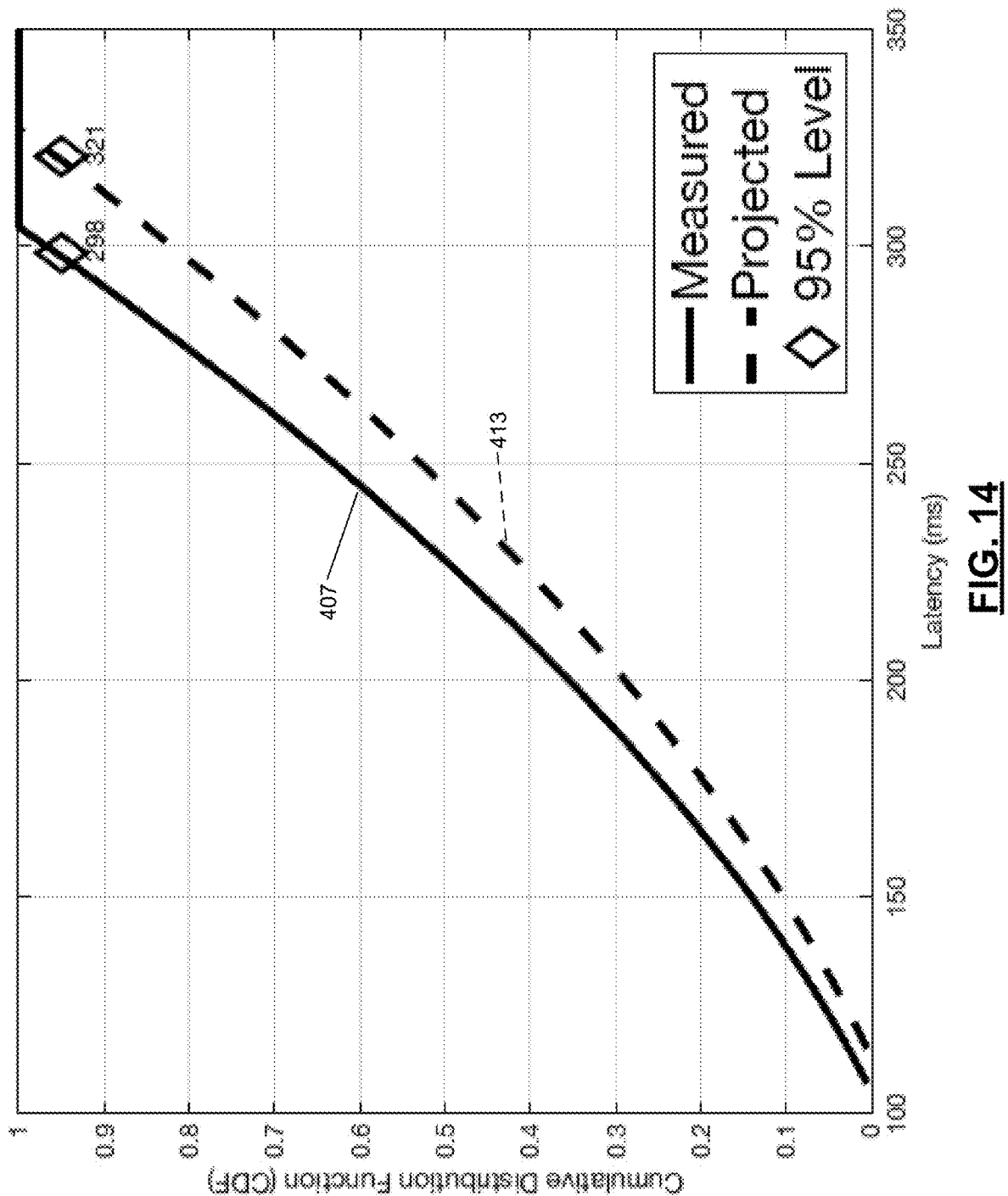
FIG. 14 is an example plot of the CDF curve of FIG. 10 and a CDF curve generated based on the projected latency samples of FIG. 12 in accordance with an embodiment of the present disclosure.

At 406E, the projection characterization module 260 characterizes the projected latency estimates. This may include generating a PDF curve and a CDF curve similar to operation 406B, but based on the projected latency estimates instead of the obtained latency estimates. FIG. 13 shows an example plot of the PDF curve 405 of FIG. 9 and a projected PDF curve 411. The PDF curve 411 is generated based on the projected latency samples of FIG. 12. FIG. 14 shows an example plot of the CDF curve 407 of FIG. 10 and a projected CDF curve 413 generated based on the projected latency samples of FIG. 12.

At 406F, the projection characterization module 260 calculates a projected latency confidence interval (or level) based on the projected CDF curve. Based on the example of FIG. 14, the latency confidence level is 95% that the latency is between approximately (i) 110-300 milli-seconds (ms) for the CDF generated based on the obtained latency estimates, and (ii) 125-340 ms for the projected CDF generated based on the projected latency estimates.

At 408, the analysis module 106 and/or the application enable module 140 may determine whether the obtained latency estimates and/or the projected latency estimates are less than an application maximum permitted latency. If this is true, operation 410 may be performed, otherwise operation 412 is performed. Operation 408 may include the analysis module 106 and/or the application enable module 140 also or alternatively determining whether the confidence level, corresponding to the projected latency estimates being less than a predetermined maximum permitted latency or within a predetermined range, is greater than or equal to a predetermined confidence level. If this is true, operation 410 may be performed, otherwise operation 412 is performed.

As an example, an application may be executed that requires an overall or average latency of less than or equal to 300 ms with a confidence level of 95%. If the obtained or predicted latency estimates have an overall or average latency of less than or equal to 300 ms with a confidence level of greater than or equal to 95%, then the application is permitted to be executed. In an embodiment, if the overall or average of the obtained latency estimates satisfy the requirements for executing a certain application and the overall or average of projected latency estimates do not satisfy the requirements, then the application is not permitted to be executed. If the overall or average of the obtained latency estimates do not satisfy the requirements for executing the application and the overall or average of projected latency estimates do satisfy the requirements, then the application is permitted to be executed.

At 410, the application enable module 140 enables operation of and/or initiates execution of one or more applications (e.g., one or more of the applications 321). This may include signaling one or more of the vehicle control modules 302 that execution of the one or more applications is permitted and/or setting states of one or more flags (or bits) in the memory 312 indicating that execution of the one or more applications is permitted. As an example, the bits may be set to '1' when execution is permitted. A different bit may be set for each application. Each bit may be associated with one or more applications. The vehicle control modules 302 may access the bits when determining whether execution of the one or more applications is permitted. At 412, the application enable module 140 prevents execution of one or more applications. The application enable module 140 may set the bits to '0' indicating execution of the one or more applications is not permitted. The application enable module 140 may generate a visual or audible warning signal indicating that the application is not permitted to be executed at this time. The method may end at 414.

Figure 15:
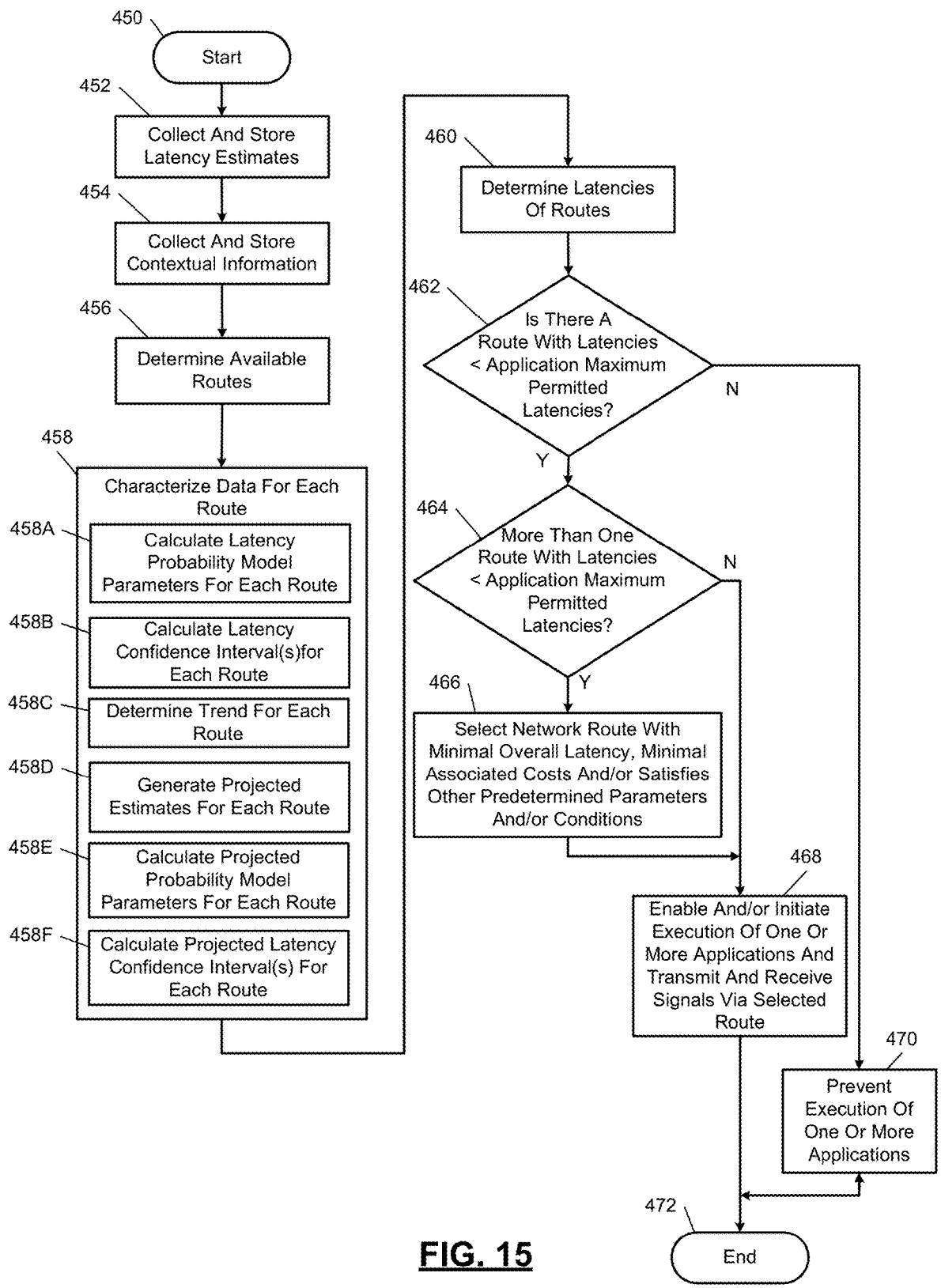
FIG. 15 illustrates an example application enabling and network routing method in accordance with an embodiment of the present disclosure.

FIG. 15 shows an example application enabling and network routing method. Although the following operations of the following methods are primarily described with respect to the implementations of FIGS. 1-6, the operations may be easily modified to apply to other implementations of the present disclosure. The operations may be iteratively performed.

The method may begin at 450. At 452, the estimate sample module 252 collects, calculates and/or stores latency estimates as described above this may be done using, for example, ping and timestamp difference based methods. This may occur during a data collection mode of operation. The latency estimates may be determined based on data rates of links involved, amounts of data being transferred, and/or other associated information. At 454, the estimate sample module 252 may also collect and store contextual information corresponding to the latency estimates.

Figure 16:
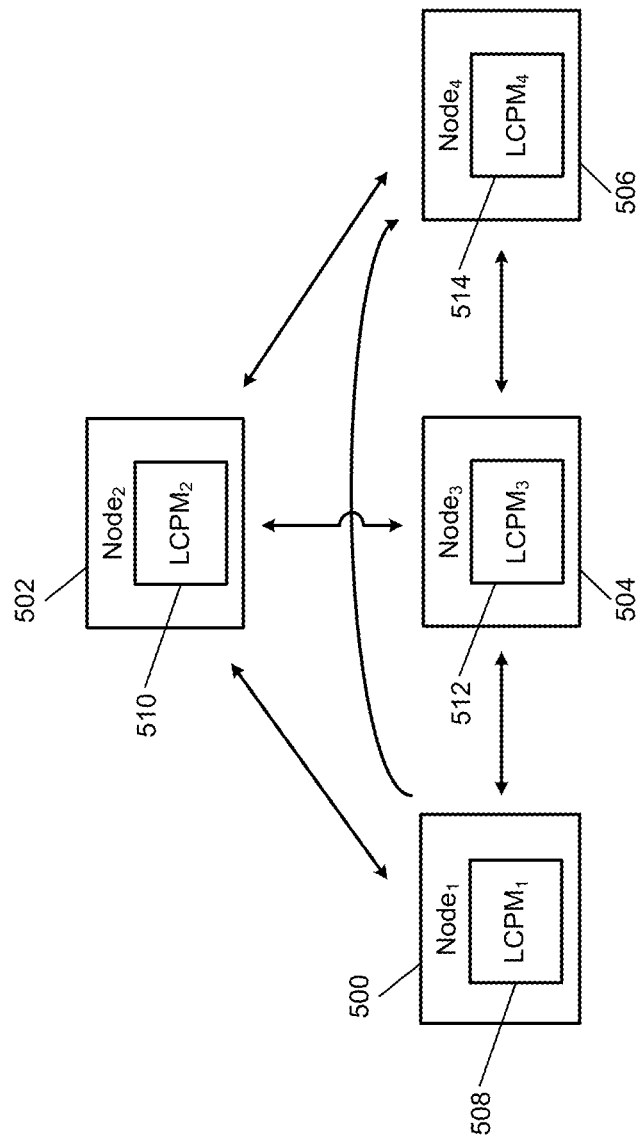
FIG. 16 is functional block diagram of an example of a network including nodes and implementing a network routing method in accordance with an embodiment of the present disclosure.

At 456, the navigation system 310 may determine available or possible network routes for signal transmission. FIG. 16 shows some example network routes between nodes. In FIG. 16 nodes 500, 502, 504, 506 are shown. The nodes may have respective LCPMs 508, 510, 512, 514. A signal may be transmitted along a first route from the first node 500 to the second node 502 and then to a fourth node 514. The signal may alternatively be sent along a second route from the first node 500 directly to the fourth node 506. The signal may alternatively be sent along a third route from the first node 500 to the third node 504 and then to the fourth node 506. As yet another example, the signal may be sent along a fourth route from the first node 500 to the second node 502, then to the third node 504 and then to the fourth node 506. The signal may also be sent along a fifth route from the first node 500 to the third node 504 and then to the second node 502 followed by the fourth node 506. Different node resources are used depending on the route used. The signals transmitted between the nodes are unicast signals.

At 458, the sample characterization module 254 characterizes the latency estimates obtained during operation 452 that are associated with each of the available network routes. In an embodiment, the last predetermined number N of latency estimates for each of the routes is characterized during a characterization mode. This includes probabilistic modeling, for example, estimating parameters of a normal distribution and/or creating one or more other characterization models. This may include calculating latency probability model parameters and calculating a latency confidence interval and/or level, as represented by operations 458A and 458B. In an embodiment, the latency estimates are characterized by generation of a model, which in one embodiment is in the form of a PDF curve. PDF estimation may be performed using, for example, empirical methods, such as histogram and kernel smoothing methods. Other model estimation methods may be performed including a Gaussian distribution method, a Half-normal distribution method, a method including a mixture of Gaussian functions, a Gamma distribution method, or other modeling method. A cumulative density (or distribution) function curve may be generated based on the PDF curve. The latency confidence interval and/or level may be determined based on the CDF curve.

At 458C, the trend module 256 determines trends based on the latency estimates. A last predetermined number M of latency estimates for each of the routes are used for trend analysis during an analysis mode. This may include using regression methods (linear and non-linear methods), auto-regression methods, auto-regressive-moving-average models, auto-regressive integrated moving average methods, Kalman filter prediction methods, trend following methods, neural networks, deep learning methods, and/or other trend analysis and/or machine learning techniques. This may include generating an estimated and projected trend line (or curve) for each of the routes. As an example, the trend lines may be determined based on averages of the latency estimates for predetermined points in time or predetermined periods of time.

At 458D, the point projection module 258 generates projected latency estimates based on the trend lines and/or the previously obtained latency estimates. At 458E, the projection characterization module 260 characterizes the projected latency estimates. This may include generating a PDF curve and a CDF curve for each route similar to operation 458B, but based on the projected latency estimates instead of the obtained latency estimates. At 458F, the projection characterization module 260 calculates projected latency confidence intervals (or levels) based on the projected CDF curves.

At 460, the analysis module 106 may determine the overall or average projected latencies for each of the routes. For each of the routes, the overall projected latency may be a sum of the projected latencies along the corresponding generated trend line. In an embodiment, the analysis module 106 determines an average projected latency for each route based on the projected latencies along the corresponding generated trend line.

At 462, the analysis module 106 and/or the network route module 142 may determine whether the obtained latency estimates and/or the projected latency estimates for each of the routes are less than an application maximum permitted latency. If this is true, operation 464 may be performed, otherwise operation 470 is performed. Operation 462 may include the analysis module 106 and/or the network route module 142 also or alternatively determining whether the confidence level, corresponding to the projected latency estimates for each of the routes being less than a predetermined maximum permitted latency or within a predetermined range, is greater than or equal to a predetermined confidence level. If this is true, operation 464 may be performed, otherwise operation 470 is performed.

Figure 17:
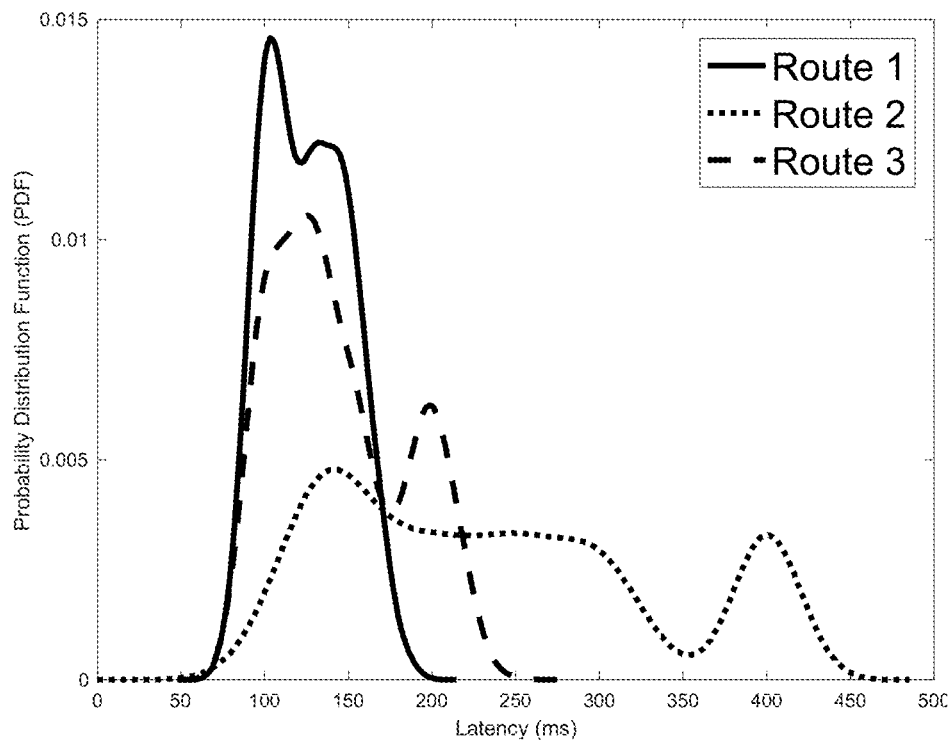
FIG. 17 is an example plot of PDF curves for different network routes in accordance with an embodiment of the present disclosure.
Figure 18:
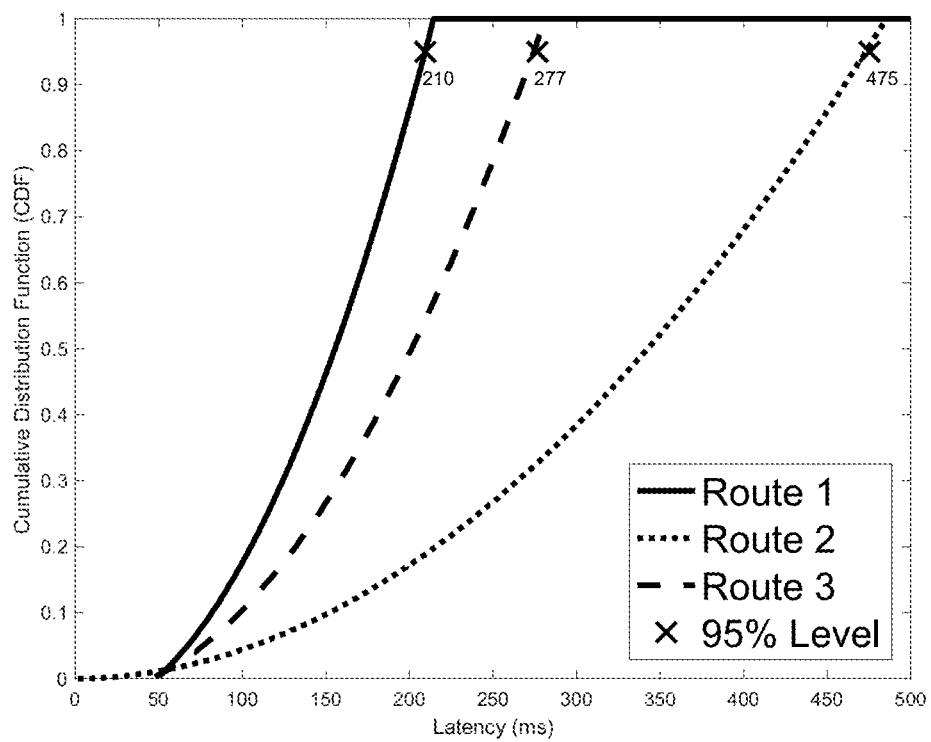
FIG. 18 is an example plot of CDF curves corresponding to the PDF curves of FIG. 17 in accordance with an embodiment of the present disclosure.

As an example, the CDFs may indicate for a 95% confidence level, the associated latency of a first route is less than or equal to 210 ms, a second route is less than or equal to 277 ms, and a third route is 475 ms. If an application requirement is a 95% confidence level with a latency of less than or equal to 300 ms, then the first and second routes may be used and the third route may not be used. If the latency requirement is less than or equal to 500 ms, then all three routes may be used. If the latency requirement is less than or equal to 200 ms, then none of the routes may be used. Example PDF curves and corresponding CDF curves for this example are shown in FIGS. 17 and 18. Each of the PDF curves may have one or more peaks depending on the number of varying parameters involved.

At 464, the network route module 142 may determine whether there is more than one route with obtained latency estimates and/or the projected latency estimates less than the application maximum permitted latency. If this is true, then operation 466 may be performed, otherwise operation 468 may be performed. Operation 464 may include the network route module 142 also or alternatively determining whether the confidence level, corresponding to the projected latency estimates for each of the routes being less than the predetermined maximum permitted latency or within the predetermined range, is greater than or equal to the predetermined confidence level. If this is true, operation 466 is performed, otherwise operation 468 may be performed.

At 466, the network route module 142 may select the network route with least overall and/or average signal latency, minimal associated costs and/or that satisfies other predetermined parameters, conditions and/or criteria. Although a route is selected, as the signals are transmitted from node-to-node, intermediary nodes along the route may recalculate and reevaluate current and projected latencies and may change the route of the signals. At 468, the application enable module 140 enables operation of and/or initiates execution of one or more applications (e.g., one or more of the applications 321). This may include signaling one or more of the vehicle control modules 302 that execution of the one or more applications is permitted and/or setting states of one or more flags (or bits) in the memory 312 indicating that execution of the one or more applications is permitted. Signals transmitted during execution of the one or more applications may be transmitted over the selected network route At 470, the application enable module 140 prevents execution of one or more applications. The application enable module 140 may set the bits to '0' indicating execution of the one or more applications is not permitted. The application enable module 140 may generate a visual or audible warning signal indicating that the application is not permitted to be executed at this time. The method may end at 472.

Figure 19:
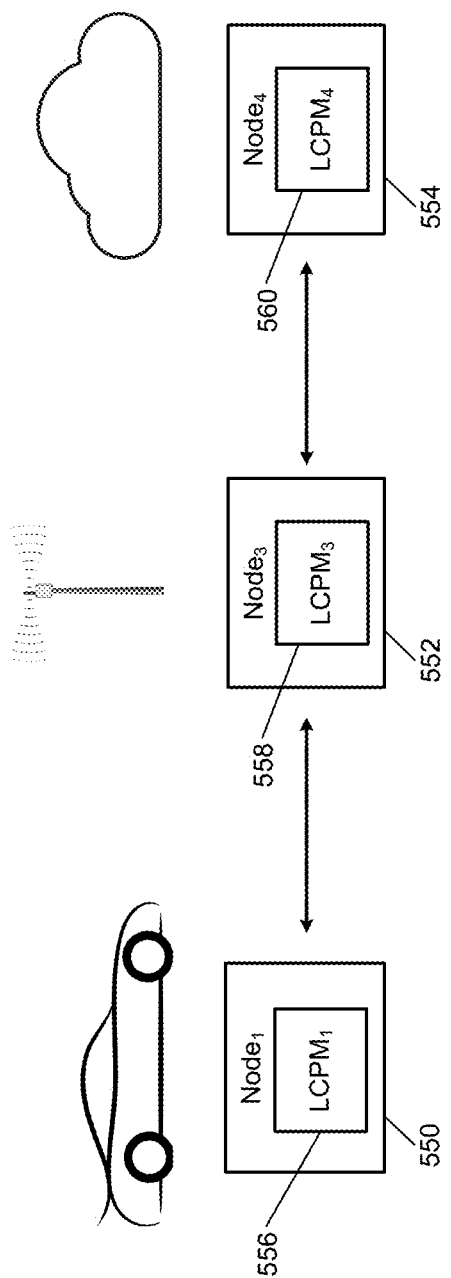
FIG. 19 is a functional block diagram of an example of a network configured to enable an in-vehicle application in accordance with an embodiment of the present disclosure.

FIG. 19 shows a network 540 that includes nodes 550, 552, 554 having respective LCPMs 556, 558, 560. In the example shown, the first node 550 is implemented as a vehicle, the second node 552 is implemented as a RSD, and the third node 554 is implemented as a cloud-based server. In this example, one or more of the LCPMs 556, 558, 560 may determine and share latency information, such as latency projection estimates and corresponding confidence intervals or levels, with the other LCPMs 556, 558, 560. An analysis module (e.g., the analysis module 106 of FIG. 3) of the first node 550 may permit execution of one or more applications (e.g., one or more of the applications 321 of FIG. 6) based on the latency information.

As a first example, a lane change assistance application may have a latency maximum requirement of 100 ms. One or more vehicle control modules of the vehicle may thus need to communicate with the RSD within the latency requirement of 100 ms. One or more of the LCPMs 556, 558, 560 may estimate the latency to be less than 100 ms with a confidence level of 95% based on a latest data collection period (e.g., 1 minute) and determine that this latency is expected to remain constant for a next predetermined period of time (e.g., 1 minute). As a result, the lane change assistance application is permitted to be executed.

As another example, a lane change assistance application may have a latency maximum requirement of 100 ms. One or more of the LCPMs 556, 558, 560 may estimate the latency to be less than 100 ms with a confidence level of 95% based on a latest data collection period (e.g., 2 minutes), however trend analysis indicates that the latency may increase to being greater than 100 ms during a next predetermined period of time (e.g., 1 minute). As a result, the lane change assistance application is not permitted to be executed since the latency trend is moving out of the required range.

As another example, a lane change assistance application may have a latency maximum requirement of 100 ms. One or more of the LCPMs 556, 558, 560 may estimate the latency to be less than 150 ms with a confidence level of 95% based on a latest data collection period (e.g., 2 minutes) and trend analysis shows the expected latency to be less than 100 ms for a next predetermined period of time (e.g., 1 minute). As a result, the lane change assistance application is not permitted to be executed because the current latency estimate is not yet less than 100 ms.

Figure 20:
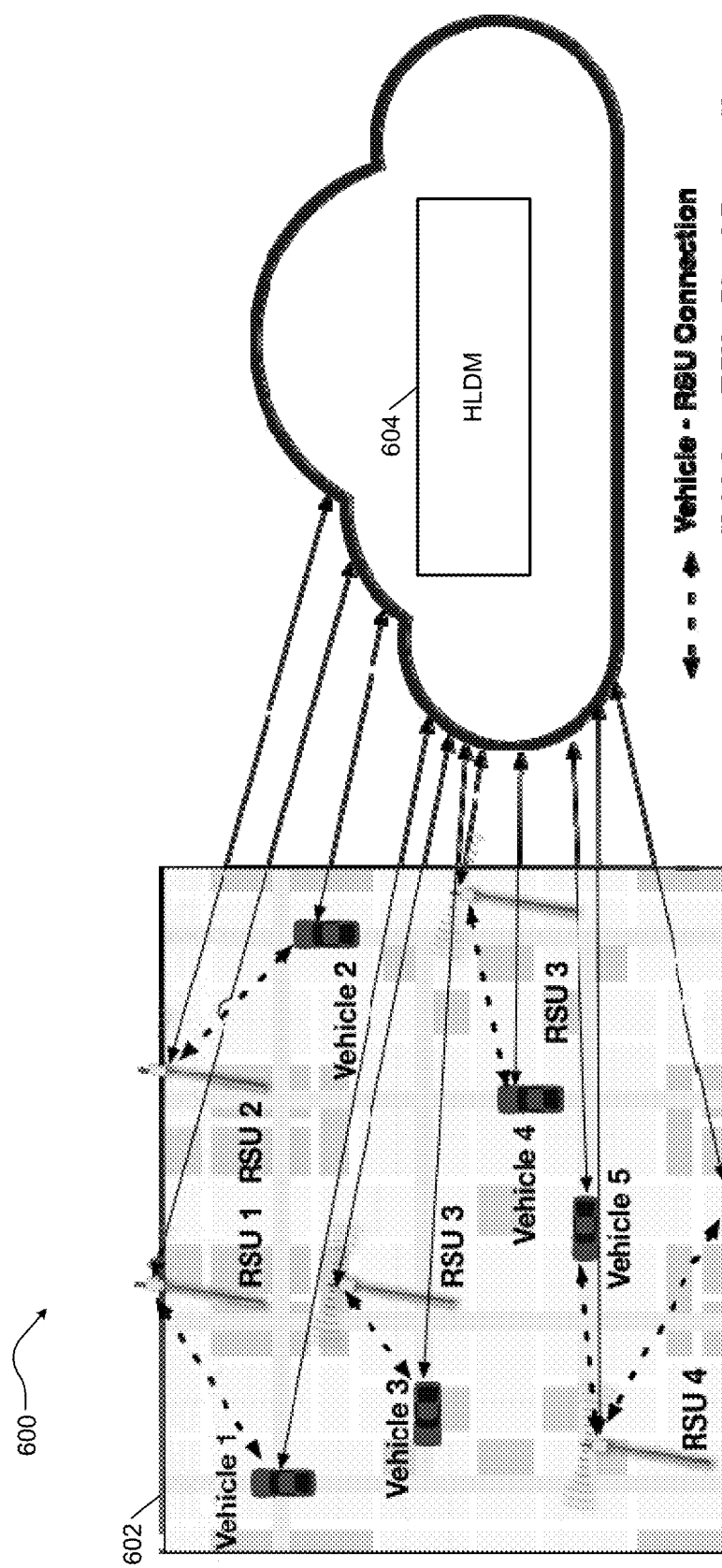
FIG. 20 is an example geographical operation diagram illustrating latency prediction monitoring and sharing in accordance with an embodiment of the present disclosure.

FIG. 20 shows an example geographical operation diagram 600 illustrating latency prediction monitoring and sharing. One example implementation of the HLDM 280 of FIG. 5 is to collect data as vehicles move in a geographical area and make predictions about service availability on different routes. FIG. 20 shows vehicles 1-6 within a geographical area 602 and communicating with RSDs (or RSUs) 1-4 and a HLDM 604. The HLDM 604 may be implemented in a cloud-based network as shown or may be located in one of the vehicles 1-6 or one of the RSDs 1-4. In one embodiment, the HLDM 604 is implemented in a server of the cloud-based network or in a node of the cloud-based network.

Figure 21:
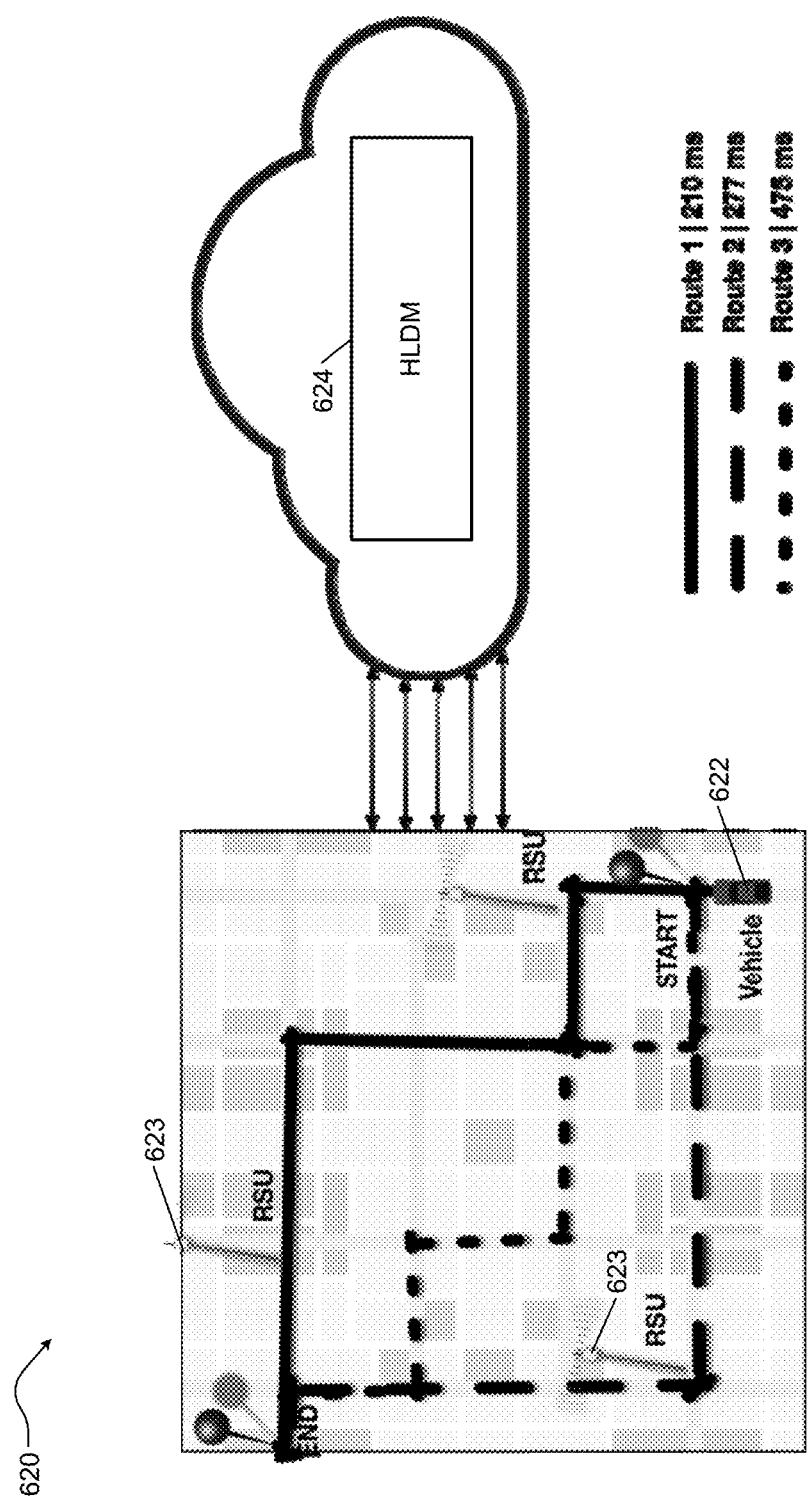
FIG. 21 is another example geographical operation diagram illustrating example travel routes in accordance with an embodiment of the present disclosure.

FIG. 21 shows another example geographical operation diagram 620 illustrating example travel routes 1-3 for a vehicle 622 and corresponding example overall or average latencies. The vehicle 622 may be in communication with RSDs (RSUs) 623 and a HLDM 624. The HLDM 624 may be implemented in a cloud-based network as shown or may be located in the vehicle 622 or one of the RSDs. In one embodiment, the HLDM 624 is implemented in a server of the cloud-based network or in a node of the cloud-based network.

In the example shown, one of three possible traveling routes between start and end points may be selected. A PDF and/or a CDF may be determined for each of the traveling routes based on the data stored in the databases 288, 290. Example PDFs and CDFs that may be provided for the three routes are shown in FIGS. 17 and 18.

As an example, using the CDFs shown in FIG. 18, and assuming a 95% confidence level, the latency for the Route 1 is less than or equal to 210 ms, for Route 2 is less than or equal to 277 ms, and for Route 3 is less than or equal to 475 ms. If an application requires a latency of less than or equal to 300 ms, then either one of the Routes 1 and 2 may be used. If the application requires a latency of less than or equal to 500 ms, any one of the routes may be used. If the application requires a latency of less than or equal to 200 ms, then none of the routes satisfy the maximum latency.

Figure 22:
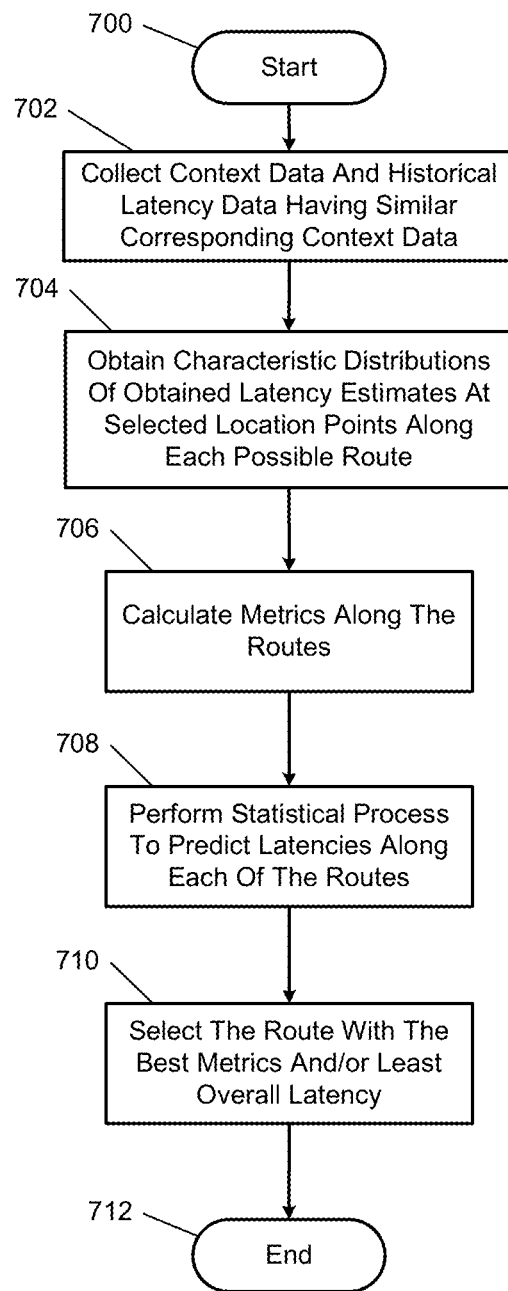
FIG. 22 illustrates an example travel route selection method based on metrics in accordance with an embodiment of the present disclosure.

FIG. 22 shows an example vehicle route selection method based on characteristic distributions and metrics. This is a method for evaluating the latencies along possible routes and includes estimating latencies for key location points along possible travel routes. Key location points are (i) defined as locations that the characteristics associated with latency change significantly, and/or (ii) locations where a corresponding vehicle changes from being connected to a first RSD to being connected to a second RSD. Although the following operations of the following methods are primarily described with respect to the implementations of FIGS. 1-6, the operations may be easily modified to apply to other implementations of the present disclosure. The operations may be iteratively performed.

The method may begin at 700. At 702, the latency data module 282 and the condition and context module 284 collect data. This may include collecting historical latency data having similar corresponding contextual data. Similar contextual data may be, for example, contextual data of the same type, having values within predetermined ranges of each other, having values less than predetermined values, having values greater than predetermined values, etc. The latency data module 282 may operate as a latency data collection manager and collect latency estimates from the historical latency database 288 and/or from other nodes, for example, via the transceiver 114 of FIG. 3. The latency data module 282 may control the flow of latency estimates between the node 100 of FIG. 3 and the other nodes in a corresponding network. The flow may be controlled by analyzing content of the historical latency database 288. In an embodiment, the latency data module 282 determines a number of relevant samples stored in the historical latency database 288 and if the number of samples is greater than a predetermined number, then the latency data module 282 ceases receiving latency estimates. This minimizes the amount of network bandwidth and resources used for this purpose.

The condition and context module 284 may operate similarly as the latency data module 282. The condition and context module 284 may operate as a latency data collection manager and collect context information from the context database 290 and/or from other nodes, for example, via the transceiver 114 of FIG. 3. The condition and context module 284 may control the flow of context information between the node 100 of FIG. 3 and the other nodes in a corresponding network. The flow may be controlled by analyzing content of the context database 290. In an embodiment, the condition and context module 284 determines a number of relevant samples stored in the context database 290 and if the number of samples is greater than a predetermined number, then the condition and context module 284 ceases receiving context information. The databases 288, 290 may be accessed based on a list of input conditions.

Figure 23:
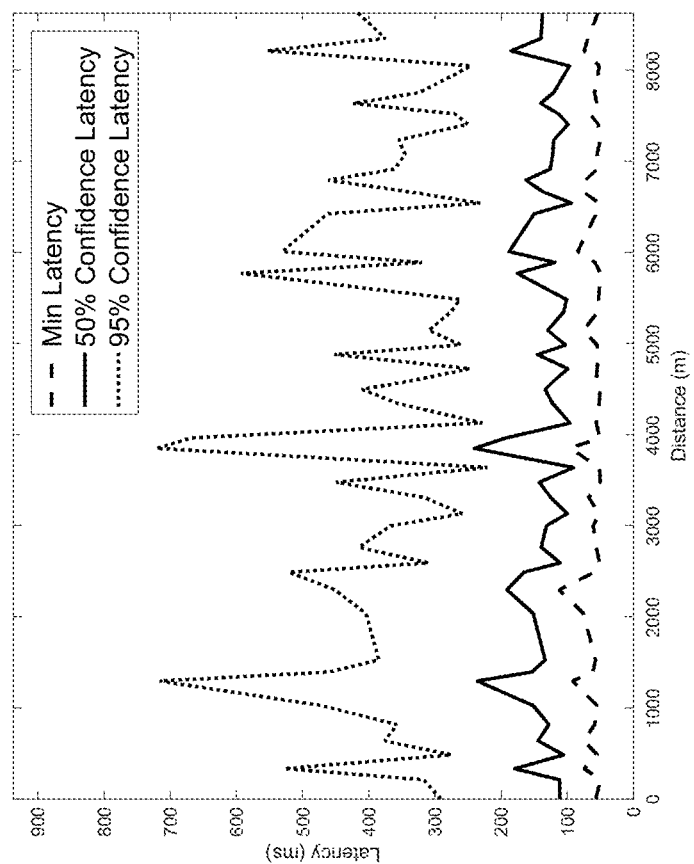
FIG. 23 illustrates an example plot of estimated latencies along a first travel route (Route A).
Figure 24:
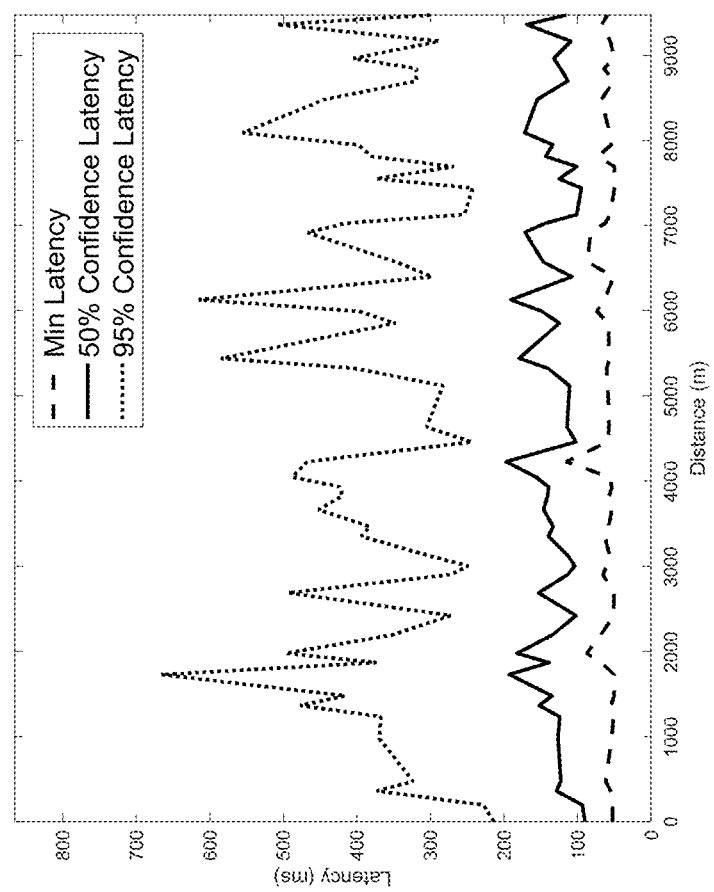
FIG. 24 illustrates an example plot of estimated latencies along a second travel route (Route B).
Figure 25:
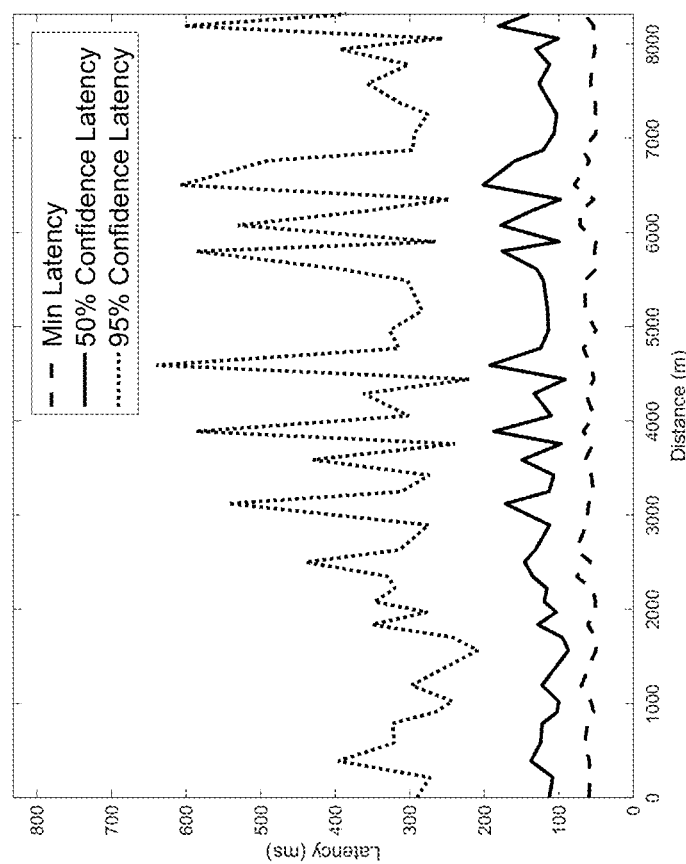
FIG. 25 illustrates an example plot of estimated latencies along a third travel route (Route C).

At 704, the historical characterization module 286 may obtain characteristic distributions of the obtained latency estimates at selected or predetermined locations along each possible travel route. The characteristic distributions, as an example, may be latency estimates for corresponding distances along the travel routes. Example plots of latency estimates along example routes A-C are shown in FIGS. 23-25. Each of the plots includes a minimum latency curve, a 50% confidence latency curve, and a 95% confidence latency curve. The minimum latency curves indicate minimum latencies along corresponding travel routes. The 50% confidence latency curves indicate that there is a 50% probability that the latencies are less than or equal to the indicated latencies for the given distances along the travel routes. The 95% confidence latency curves indicate that there is a 95% probability that the latencies are less than or equal to the indicated latencies for the given distances along the travel routes.

At 706, the historical characterization module 286 may calculate metrics along the travel routes. FIG. 26 shows an example table with example metrics. The metrics in table 1 include minimum latencies, maximum latencies, total distances of routes, sum of minimum latencies at key points, sum of all the 50% (mean) confidence latencies at each key location point (or sum of 50% latencies), sum of all the 95% (or other predetermined percentage) confidence latencies at each key location point (or sum of 95% latencies). The stated metrics are examples and other metrics may be considered in addition or instead of the stated metrics. Examples of additional metrics are: navigation metrics; estimated arrival times; amounts of traffic; costs of communications, which may be based on the service provider and/or number of providers available in a given area; costs of communication associated with one or more service classes set by a service provider; etc.

In an embodiment, the metrics are used to define a score function values for each of the routes, which are then used during operation 710 to evaluate and select one of the routes. As an example, the score function may be a weighted sum of the metrics. An example weighted sum function is provided as equation 1, where $a_x$ is a weighting coefficient and x, y, and z define confidence levels. Continuing from the same above example, x may be 50% and y and z may be 95%.

$$f = a_1\text{min\_latency} + a_2\text{max\_latency} + a_3\text{total\_distance} + \quad (1)$$
$$a_4\text{sum\_of\_min\_latencies} + a_5\text{sum\_of\_x\_conf\_latencies} +$$
$$a_6\text{sum\_of\_y\_conf\_latencies} + a_7\text{z\_conf\_latencies}$$

Minimum and maximum values may be defined for each of the metrics, which may be used to disqualify a route that is outside ranges corresponding to the minimum and maximum values for the metrics.

Figure 28:
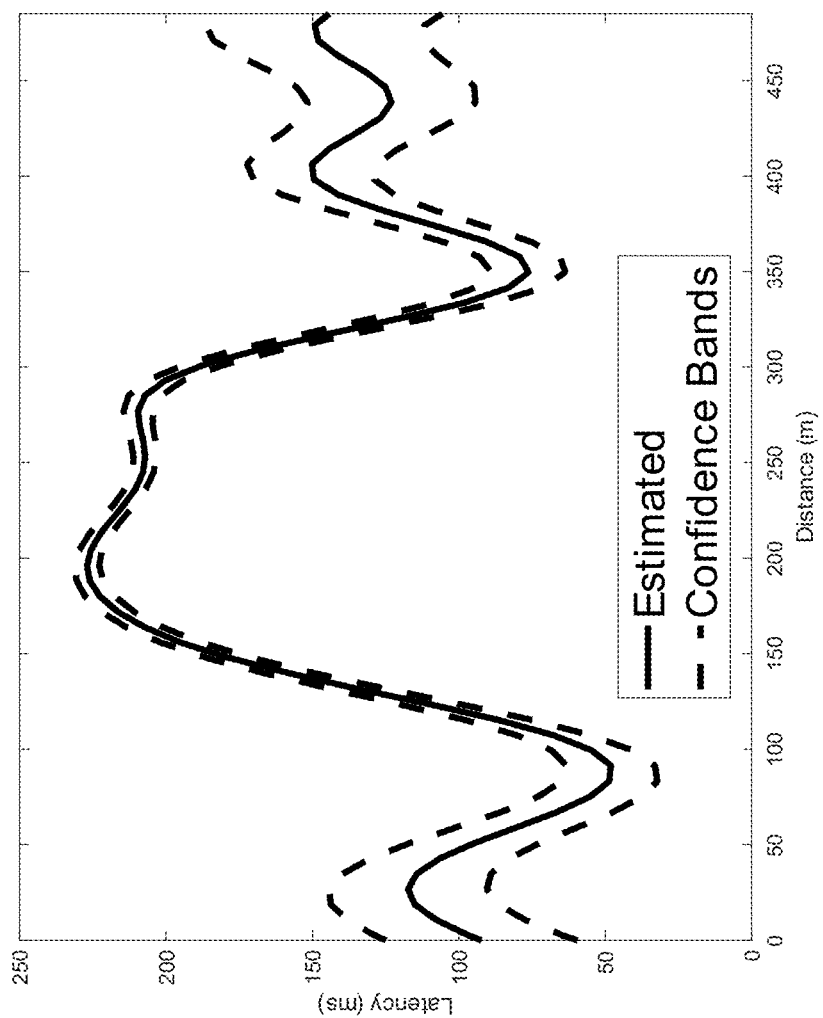
FIG. 28 is an example plot of latencies versus distance for a travel route in accordance with an embodiment of the present disclosure.

At 708, the historical characterization module 286 may perform a statistical process to predict latencies along each of the travel routes. This may include implementing a Gaussian process or other statistical process to predict the latencies along each of the travel routes. In an embodiment, confidence bands are generated based on the number of predicted latency samples available. FIG. 28 shows estimated latencies along a route and corresponding confidence bands. For each distance along the route, the closer the confidence band curves are to the estimated latency curve, the higher the confidence level is for the estimated latency at that point along the estimated latency curve.

At 710, the travel route module 144 selects the travel route with the best metrics and/or least overall latency and/or overall predicted latency. This may include selecting travel route with the smallest score function value. The travel route module 144 may select: the shortest traveling route; the traveling route with a minimal overall latency and/or minimal average signal latency; or a traveling route that is not the shortest route and does not have the minimal overall and/or average signal latency. In an embodiment, the traveling route is selected based on a sum of a predetermined weighting of metrics for each of the traveling routes. As a simplified example, the predetermined weighting may include multiplying predetermined weights by (i) the length of the traveling route, and (ii) the overall and/or average signal latency. The travel route or paths with the minimal overall latencies may allow for enablement of certain vehicle applications, which may increase vehicle and occupant safety. A selection of a travel route may include weighing the length of travel route, the latency of signals, and/or the safety level associated with the latency of the signals and/or the vehicle applications enabled. In another embodiment, weights (e.g., predetermined weighted percentages) of the length and the overall and/or average signal latency are set based on user inputs. User inputs may be provided for weights, maximum thresholds, and/or minimum thresholds for any of the metrics. In an embodiment, if one or more of the metrics for a route are not less than predetermined maximum values, greater than predetermined values, and/or within predetermined ranges, then that route is not selected. The length of a travel route that a vehicle is a distance between a first geographical location and a second geographical location. The GPS 322 may determine the first geographical location of the vehicle.

In the examples of FIGS. 23-26, it can be observed that Route C has the lowest value for all the metrics except the minimum latency which is minimally higher at 50.1 ms versus 50 ms. If only one metric is used (except min latency), then Route C is selected. The same is true if, for each of the routes, the corresponding metric values are added together to provide a sum. The route having the lowest sum may be selected. The method may end at 712.

Figure 27:
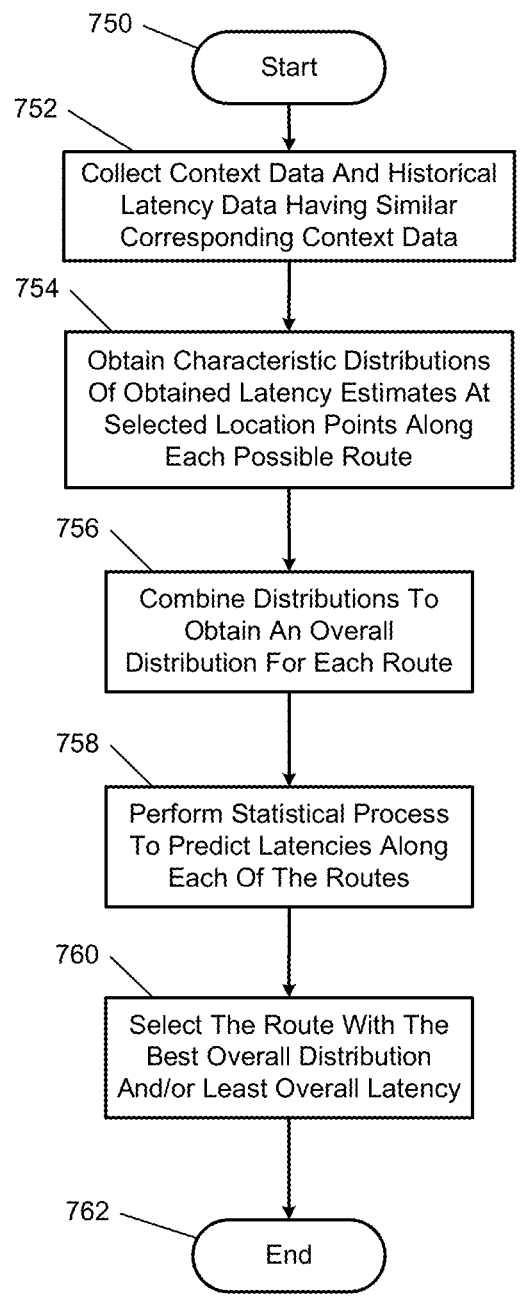
FIG. 27 illustrates another example travel route selection method based on distributions in accordance with an embodiment of the present disclosure.

FIG. 27 shows another example vehicle route selection method based on distributions. This method includes estimating an overall latency profiles for possible travel routes. The overall latency profiles include latencies along the routes. The method focuses on the overall profiles, which may be defined by latency PDFs and/or latency CDFs. The PDFs and/or the CDFs may be used to define a score function for each of the routes. Although the following operations of the following methods are primarily described with respect to the implementations of FIGS. 1-6, the operations may be easily modified to apply to other implementations of the present disclosure. The operations may be iteratively performed. The following operations are similar to the operations of FIG. 22, except instead of being metric based, the method is distribution (e.g., PDF and/or CDF) based.

The method may begin at 750. At 752, the latency data module 282 and the condition and context module 284 collect data. As stated above, the latency data module 282 may operate as a latency data collection manager and collect latency estimates from the historical latency database 288 and/or from other nodes, for example, via the transceiver 114 of FIG. 3. The latency data module 282 may control the flow of latency estimates between the node 100 of FIG. 3 and the other nodes in a corresponding network. The flow may be controlled by analyzing content of the historical latency database 288. In an embodiment, the latency data module 282 determines a number of relevant samples stored in the historical latency database 288 and if the number of samples is greater than a predetermined number, then the latency data module 282 ceases receiving latency estimates.

The condition and context module 284 may operate similarly as the latency data module 282. The condition and context module 284 may as stated above operate as a latency data collection manager and collect context information from the context database 290 and/or from other nodes, for example, via the transceiver 114 of FIG. 3. The condition and context module 284 may control the flow of context information between the node 100 of FIG. 3 and the other nodes in a corresponding network. The flow may be controlled by analyzing content of the context database 290. In an embodiment, the condition and context module 284 determines a number of relevant samples stored in the context database 290 and if the number of samples is greater than a predetermined number, then the condition and context module 284 ceases receiving context information. The databases 288, 290 may be accessed based on a list of input conditions.

At 754, the historical characterization module 286 may obtain characteristic distributions of the obtained latency estimates at selected or predetermined locations along each possible travel route. The characteristic distributions, as an example, may be latency estimates for corresponding distances along the travel routes. Example plots of latency estimates along example routes A-C are shown in FIGS. 23-25. Each of the plots includes a minimum latency curve, a 50% confidence latency curve, and a 95% confidence latency curve. The minimum latency curves indicate minimum latencies along corresponding travel routes. The 50% confidence latency curves indicate that there is a 50% probability that the latencies are less than or equal to the indicated latencies for the given distances along the travel routes. The 95% confidence latency curves indicate that there is a 95% probability that the latencies are less than or equal to the indicated latencies for the given distances along the travel routes.

At 756, the historical characterization module 286 may combine the characteristic distributions to obtain an overall distribution for each travel route. This may include determining a PDF and/or a CDF for each of the routes, as described above. Example plots of PDFs and CDFs are shown in FIGS. 17, 18. This provides estimated overall latency profiles for each of the travel routes. In an embodiment, a score function value is generated for each of the travel routes based on the PDFs and/or the CDFs. The score function values may be generated based on the overall expected latencies with a predetermined confidence level (e.g., 95%) for each of the travel routes.

At 758, the historical characterization module 286 may perform a statistical process to predict latencies along each of the travel routes. This may include implementing a Gaussian process or other statistical process to predict the latencies along each of the travel routes. In an embodiment, confidence bands are generated based on the number of predicted latency samples available. FIG. 28 shows estimated latencies along a route and corresponding confidence bands. For each distance along the route, the closer the confidence band curves are to the estimated latency curve, the higher the confidence level is for the estimated latency at that point along the estimated latency curve.

At 760, the travel route module 144 selects the travel route with the best overall distribution and/or least overall latency and/or overall predicted latency. This may be based on the score function values. The travel route with the smallest score function value may be selected. The method may end at 762.

The above-described operations of FIGS. 7, 15, 22, and 27 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 29:
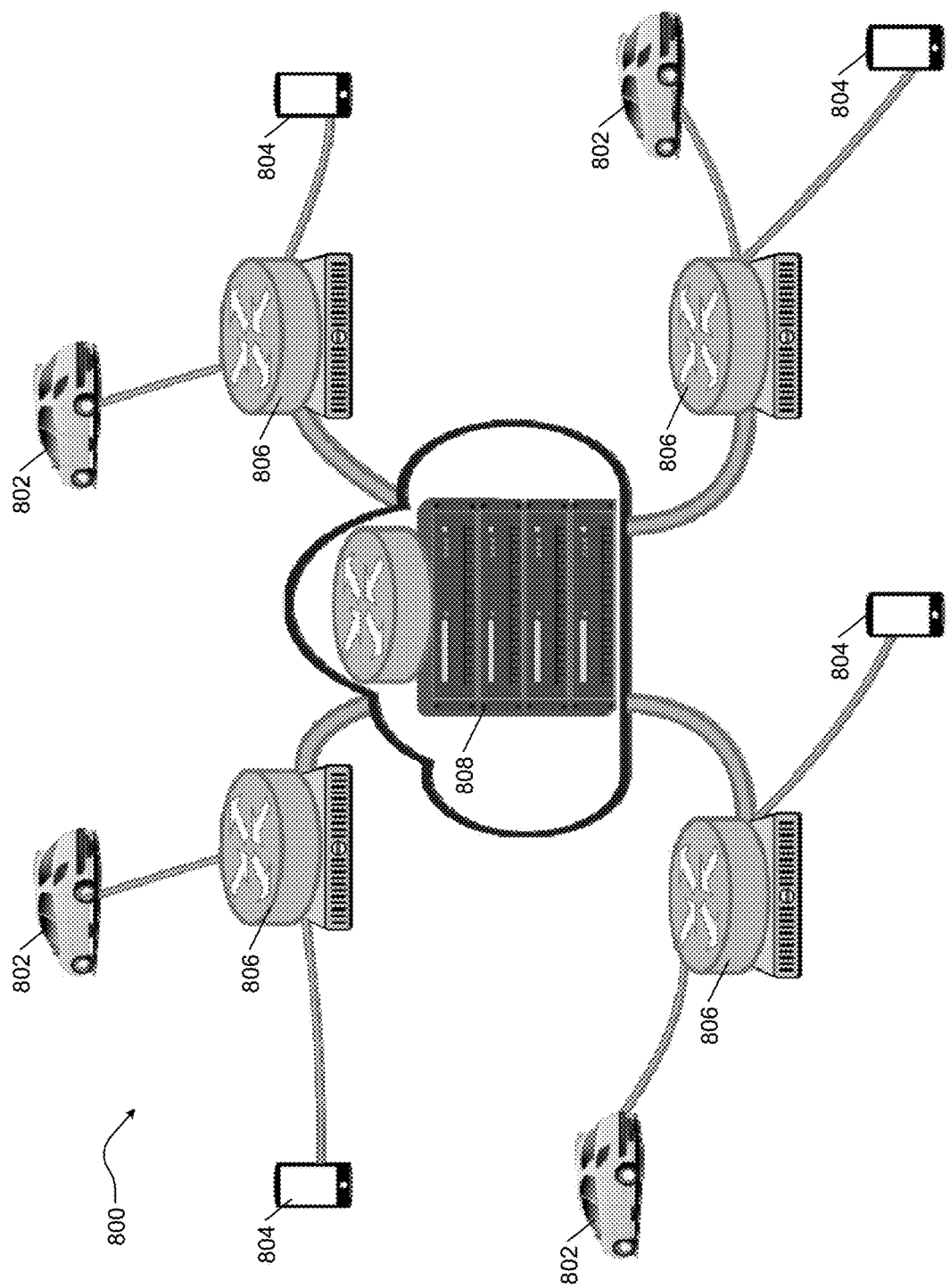
FIG. 29 is an example of a cloud-based network collection, monitoring and reporting system in accordance with an embodiment of the present disclosure.

FIG. 29 shows an example of a cloud-based network collection, monitoring and reporting system 800. As shown, the system 800 may include vehicles 802, mobile devices (or other network devices) 804, RSDs 806, a cloud-based datacenter 808 and/or other nodes. The HLDM 104 of FIG. 3 may be implemented in the cloud-based datacenter 808 and collect historical data under various conditions (e.g., numbers of vehicles, locations, times of day, dates, weather, local incidents, major events, holidays, and/or other contextual information). The collected data may be utilized to generate reports of usage trends and identify conditions that cause network bottlenecks and/or other network problems. For example, a network link may fail at certain times of day, month or year. The HLDM 104 may analyze the collected data and indicate that there is unusual traffic during the certain times due to a major event (e.g., a football game). The reports may be shared with the nodes and the nodes may modify operations based on the provided reports. This may include preventing execution of one or more applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A travel route selection system comprising:
a historical latency data module comprising
a first data module configured to collect historical latency data, wherein the historical latency data are associated with transmission of signals in a network for one or more vehicle applications of a vehicle, and
a characterization module configured to
obtain characteristic distributions of the historical latency data at selected locations along a plurality of travel routes,
based on the characteristic distributions, perform at least one of (i) calculating metrics along the plurality of travel routes for the vehicle, or (ii) combining the characteristic distributions to obtain an overall distribution for each of the plurality of travel routes, and
based on at least one of the metrics or the overall distributions, perform a statistical process to predict latencies of the signals along each of the plurality of travel routes; and
a travel route module configured to select one of the plurality of travel routes based on the predicted latencies of the signals.

2. The travel route selection system of claim 1, wherein the historical latency data are obtained from at least one of a historical latency database, a road side device, a second vehicle, a network device, or a cloud-based server.

3. The travel route selection system of claim 1, further comprising a second data module configured to collect contextual data corresponding to the historical latency data,
wherein the first data module is configured to collect the historical latency data based on the contextual data, such that the historical latency data have similar corresponding contextual data.

4. The travel route selection system of claim 1, wherein:
the characterization module is configured to characterize the historical latency data corresponding to distances along the plurality of travel routes; and
the travel route module is configured to select the one of the plurality of travel routes based on the characterization of the historical latency data.

5. The travel route selection system of claim 1, wherein the characterization module is configured to, based on the characteristic distributions, calculate the metrics along the plurality of travel routes; and
the metrics include a minimum latency, a maximum latency, and a sum of latencies.

6. The travel route selection system of claim 1, wherein the characteristic distributions include a probability distribution function or a cumulative distribution function.

7. The travel route selection system of claim 1, wherein:
the travel route module is configured to select the one of the plurality of travel routes based on a score function value of metrics of the one of the plurality of travel routes and score function values of metrics of the other ones of the plurality of travel routes: and
the metrics of the one of the plurality of travel routes and the metrics of the other ones of the plurality of travel routes include total distance of route, a minimum latency, a maximum latency, an amount of traffic and a cost of communication.

8. The travel route selection system of claim 1, wherein the travel route module is configured to select the one of the plurality of travel routes with a least overall latency as compared to overall latencies of the other ones of the plurality of travel routes.

9. The travel route selection system of claim 1, wherein the travel route module is configured to select the one of the plurality of travel routes based on the overall distribution of the one of the plurality of travel routes and the overall distributions of the other ones of the plurality of travel routes.

10. A vehicle system comprising:
the travel route selection system of claim 1; and
a vehicle control module configured to control operation of one or more vehicle devices to facilitate routing of the vehicle along the selected one of the plurality of travel routes.

11. A method of operating a vehicle route selection system, the method comprising:
collecting historical latency data associated with transmission of signals in a network for one or more vehicle applications of a vehicle;
obtaining characteristic distributions of the historical latency data at selected locations along a plurality of travel routes;
based on the characteristic distributions, performing at least one of (i) calculating metrics along the plurality of travel routes for the vehicle, or (ii) combining the characteristic distributions to obtain an overall distribution for each of the plurality of travel routes;
based on at least one of the metrics or the overall distributions, performing a statistical process to predict latencies of the signals along each of the plurality of travel routes; and
selecting one of the plurality of travel routes based on the predicted latencies of the signals.

12. The method of claim 11, wherein the historical latency data are obtained from at least one of a historical latency database, a road side device, a second vehicle, a network device, or a cloud-based server.

13. The method of claim 11, further comprising collecting contextual data corresponding to the historical latency data, wherein the historical latency data are collected based on the contextual data, such that the historical latency data have similar corresponding contextual data.

14. The method of claim 11, comprising:
characterizing the historical latency data corresponding to distances along the plurality of travel routes; and
selecting the one of the plurality of travel routes based on the characterization of the historical latency data.

15. The method of claim 11, comprising, based on the characteristic distributions, calculating the metrics along the plurality of travel routes for the vehicle, wherein the metrics include a minimum latency, a maximum latency, and a sum of latencies.

16. The method of claim 11, comprising, based on the characteristic distributions, calculating the metrics along the plurality of travel routes for the vehicle, wherein the metrics include a sum of latencies for a predetermined confidence level.

17. The method of claim 11, wherein the characteristic distributions include a probability distribution function or a cumulative distribution function.

18. The method of claim 11, comprising selecting the one of the plurality of travel routes based on metrics of the one of the plurality of travel routes and metrics of the other ones of the plurality of travel routes.

19. The method of claim 11, comprising selecting the one of the plurality of travel routes with a least overall latency as compared to overall latencies of the other ones of the plurality of travel routes.

20. The method of claim 11, comprising selecting the one of the plurality of travel routes based on the overall distribution of the one of the plurality of travel routes and the overall distributions of the other ones of the plurality of travel routes.

21. The travel route selection system of claim 1, wherein the characteristic distributions include latency estimates for distances along the travel routes.

22. The travel route selection system of claim 1, wherein:
the characterization module is configured to use the metrics to define score function values for each of the plurality of travel routes; and
each of the score function values are based on a sum of weighted minimum latency values, maximum latency values and distance values.

23. The travel route selection system of claim 1, wherein the characterization module is configured to predict the latencies of the signals along each of the plurality of travel routes using a Gaussian process.

* * * * *

UNITED STATES PATENT AND TRADEMARK OFFICE
CERTIFICATE OF CORRECTION

PATENT NO. : 10,768,004 B2
APPLICATION NO. : 15/882489
DATED : September 8, 2020
INVENTOR(S) : Haris Volos et al.

Page 1 of 1

It is certified that error appears in the above-identified patent and that said Letters Patent is hereby corrected as shown below:

In the Claims

Column 22, Line 19: In Claim 7, delete "routes:" and insert --routes;-- therefor Signed and Sealed this
Third Day of November, 2020

Andrei Iancu
*Director of the United States Patent and Trademark Office*